US012645432B2

(12) United States Patent
Stauber et al.

(10) Patent No.: US 12,645,432 B2
(45) Date of Patent: Jun. 2, 2026

(54) COMPREHENSIVE COMPONENT ANALYSIS AND VISUALIZATION

(71) Applicant: Wix.com Ltd., Tel Aviv (IL)

(72) Inventors: Yitzhak Stauber, Ra'anana (IL); Anton Babich, Haifa (IL); Roy Gold (Haroush), Alfei Menashe (IL); Vladyslav Ursal, Kyselivka (UA); Neomie Kramer, Netanya (IL)

(73) Assignee: Wix.com Ltd., Tel Aviv (IL)

( * ) Notice: Subject to any disclaimer, the term of this patent is extended or adjusted under 35 U.S.C. 154(b) by 14 days.

(21) Appl. No.: 18/354,775

(22) Filed: Jul. 19, 2023

(65) Prior Publication Data
US 2024/0028310 A1      Jan. 25, 2024

Related U.S. Application Data

(60) Provisional application No. 63/390,408, filed on Jul. 19, 2022.

(51) Int. Cl.
| | |
|---|---|
| *G06F 8/34* | (2018.01) |
| *G06F 11/3604* | (2025.01) |
| *G06F 16/958* | (2019.01) |

(52) U.S. Cl.
CPC ............ *G06F 8/34* (2013.01); *G06F 11/3608* (2013.01); *G06F 16/986* (2019.01)

(58) Field of Classification Search
CPC ....... G06F 8/34; G06F 16/986; G06F 11/3608
See application file for complete search history.

(56) References Cited

U.S. PATENT DOCUMENTS

| | | | | |
|---|---|---|---|---|
| 8,060,553 B2 * | 11/2011 | Mamou | .................. | G06Q 10/10 709/223 |
| 8,762,938 B2 | 6/2014 | Calvin | | |
| 10,073,923 B2 | 9/2018 | Koren et al. | | |
| 10,185,703 B2 | 1/2019 | Abrahami | | |
| 10,209,966 B2 | 2/2019 | Abrahami et al. | | |
| 11,314,837 B2 | 4/2022 | Aviyam et al. | | |
| 11,449,573 B2 | 9/2022 | Abrahami et al. | | |

(Continued)

OTHER PUBLICATIONS

International Search Report for corresponding PCT application PCT/IB2023/057368 malled on Oct. 22, 2023.

*Primary Examiner* — Noor Alkhateeb
(74) *Attorney, Agent, or Firm* — Heidi Brun Associates Ltd.; Heidi M. Brun

(57) ABSTRACT

A system for a website building system (WBS) includes a component analysis and visualization (CCAV) module to analyze elements of an underlying application built using the WBS and to generate a visual system architecture diagram (SAD) representing the hierarchical arrangement of the elements. The CCAV module includes a site object build engine to gather and analyze information on the elements and to create a site object representation, a software bill of materials builder to create a software bill of materials from the site object consisting at least of assets and configuration data for the underlying application and a SAD renderer to create and display the SAD where the SAD includes a static application architecture diagram representing the at least assets and configuration data and an aggregated application architecture diagram showing an overlay of at least one of: software, hardware usage, and business data changes affecting the underlying application.

30 Claims, 19 Drawing Sheets

(56)     References Cited

U.S. PATENT DOCUMENTS

| | | | |
|---|---|---|---|
| 2013/0326481 A1* | 12/2013 | Kannan ..................... | G06F 8/75 |
| | | | 717/123 |
| 2014/0282218 A1 | 9/2014 | Kaufman et al. | |
| 2015/0324488 A1* | 11/2015 | Chandnani ......... | G06Q 10/0875 |
| | | | 703/21 |
| 2017/0032050 A1 | 2/2017 | Kol et al. | |
| 2017/0169229 A1* | 6/2017 | Brucker ............... | G06F 21/566 |
| 2019/0317755 A1* | 10/2019 | Nie ......................... | G06F 8/654 |
| 2020/0151226 A1* | 5/2020 | Blumenfeld ........ | G06F 16/9577 |
| 2020/0372206 A1* | 11/2020 | Fialkow .................... | G06F 8/34 |
| 2021/0287109 A1* | 9/2021 | Cmielowski ........... | G06N 20/00 |
| 2022/0229970 A1 | 7/2022 | Frenkel et al. | |
| 2022/0245475 A1* | 8/2022 | Blizzard .............. | G06F 3/0482 |
| 2022/0269790 A1* | 8/2022 | Rajana .................. | G06F 21/577 |
| 2023/0034984 A1* | 2/2023 | Ravindranath ........... | G06F 8/51 |
| 2023/0134419 A1* | 5/2023 | Maine ..................... | G06F 8/65 |
| | | | 717/170 |

* cited by examiner

| RULE | AREA | WHAT IS THE VALUE OF FIXING? |
|---|---|---|
| INVALID JS | | |
| USING AWAIT IN onReady() FUNCTION | PERFORMANCE | FASTER LOADING |
| MULTIPLE onReady() FUNCTIONS | UNEXPECTED RESULTS | NO UNEXPECTED RESULTS |
| DEFAULT COMPONENT NAMES THAT ARE USED BY CODE (LIKE TEXT4) | CLEAN CODE | BETTER MAINTENANCE |
| ELEMENT WITH BOTH STATIC AND DYNAMIC EVENT HANDLERS | UNEXPECTED RESULTS | NO UNEXPECTED RESULTS |
| ELEMENT WITH MULTIPLE DYNAMIC EVENT HANDLERS | UNEXPECTED RESULTS | NO UNEXPECTED RESULTS |
| ELEMENT WITH MULTIPLE STATIC EVENT HANDLERS | UNEXPECTED RESULTS | NO UNEXPECTED RESULTS |
| AWAIT THAT IS NOT WRAPPED WITH TRY/CATCH | ERROR HANDLING | BETTER ERROR HANDLING AND DEBUGGING |
| .THEN THAT DOES NOT HAVE .CATCH | ERROR HANDLING | BETTER ERROR HANDLING AND DEBUGGING |
| VAR IS BEING USED | CLEAN CODE | CLEANER CODE |
| LET IS USED BUT THE VARIABLE VALUE DOES NOT CHANGE | CLEAN CODE | CLEANER CODE |
| wixData USAGE FROM FRONT END (WARNING) | SECURITY | MORE SECURE |
| RETURN ONLY NEEDED DATA FROM QUERY TO FRONT END (FOR INSTANCE MOST OF THE TIME YOU DON'T NEED THE AUTO GENERATED IN CLIENT) | PERFORMANCE | FASTER LOADING |
| USAGE FOR suppressAuth | SECURITY | |
| SENSITIVE DATA NOT RESTORED IN SECRETS MANAGER | SECURITY | MORE SECURE |
| CODE DUPLICATION BETWEEN PAGES | CLEAN CODE | CLEANER AND SHORTER CODE |
| ° ° ° | ° ° ° | ° ° ° |

FIG. 9A-1

| RULE | AREA | WHAT IS THE VALUE OF FIXING? |
|---|---|---|
| ... | ... | ... |
| CODE DUPLICATION IN SAME PAGE | CLEAN CODE | CLEANER AND SHORTER CODE |
| EMPTY FUNCTIONS | CLEAN CODE | CLEANER AND SHORTER CODE |
| USING AWAIT INSIDE A LOOP INSTEAD OF PROMISE ALL | PERFORMANCE | FASTER LOADING |
| USING FIND INSIDE A LOOP INSTEAD OF ONE QUERY | PERFORMANCE | FASTER LOADING |
| INSERT DATA INTO A COLLECTION WITHOUT VALIDATIONS | CLEAN DATA | ENSURE CLEAN, CONSISTENT, COMPLETE DATA |
| EVENT HANDLERS WITHOUT COMPONENTS – FLOATING COMPONENTS NESTED EVENT HANDLERS | CLEAN CODE | |
| EXPORT FUNCTION WHEN NOT REQUIRED | CLEAN CODE | |
| CHECK IF SOME OF IMPORTED API NOT USED (THEY ARE HIGHLIGHTED WITH GRAY FONT-COLOR) | CLEAN CODE | |
| REPEATER onItemReady() forEachItem(), ETC. FUNCTIONS NOT USING $item | CORRECTNESS | |
| AWAIT AND .THEN() USED TOGETHER | PROMISES PROBLEM | |
| CALL TO BACKEND FUNCTION (WEB MODULE) WITHOUT HANDLING THE PROMISE | CORRECTNESS | |
| BACKEND/FRONTEND APIs | CORRECTNESS | |

FIG. 9A-2

| TO CHECK | TYPE | AREA | WHAT IS THE VALUE OF FIXING? |
|---|---|---|---|
| USING AWAIT IN onReady() FUNCTION | CODE | PERFORMANCE | FASTER LOADING |
| MULTIPLE onReady() FUNCTIONS | CODE | UNEXPECTED RESULTS | NO UNEXPECTED RESULTS |
| DEFAULT COMPONENT NAMES THAT ARE USED BY CODE (LIKE TEXT4) | CODE | CLEAN CODE | BETTER MAINTENANCE |
| ELEMENT WITH BOTH STATIC AND DYNAMIC EVENT HANDLERS | CODE | UNEXPECTED RESULTS | NO UNEXPECTED RESULTS |
| ELEMENT WITH MULTIPLE DYNAMIC EVENT HANDLERS | CODE | UNEXPECTED RESULTS | NO UNEXPECTED RESULTS |
| AWAIT THAT IS NOT WRAPPED WITH TRY/CATCH | CODE | ERROR HANDLING | BETTER ERROR HANDLING AND DEBUGGING |
| .THEN THAT DOES NOT HAVE .CATCH | CODE | ERROR HANDLING | BETTER ERROR HANDLING AND DEBUGGING |
| VAR IS BEING USED | CODE | CLEAN CODE | CLEANER CODE |
| LET IS USED BY THE VARIABLE VALUE DOSE NOT CHANGE | CODE | CLEAN CODE | CLEANER CODE |
| wixData USAGE FROM FRONT END (WARNING) | CODE | SECURITY | MORE SECURITY |
| RETURN ONLY NEEDED DATA FROM QUERY TO FRONT END (FOR INSTANCE MOST OF THE TIME YOU DON'T NEED THE AUTO GENERATED FIELD IN CLIENT) | CODE | PERFORMANCE | FASTER LOADING |
| USAGE OF suppressAuth | CODE | SECURITY | |
| SENSITIVE DATA NOT STORED IN SECRETS MANAGER | CODE | SECURITY | MORE SECURITY |
| CODE DUPLICATION 1) IN SAME PAGE 2) BETWEEN PAGES | CODE | CLEAN CODE | CLEANER AND SHORTER CODE |
| EMPTY FUNCTIONS | CODE | CLEAN CODE | CLEANER AND SHORTER CODE |
| USING AWAIT INSIDE A LOOP INSTEAD OF PROMISE.ALL | CODE | PERFORMANCE | FASTER LOADING |
| USING FOUND INSIDE A LOOP INSTEAD OF ONE QUERY | CODE | PERFORMANCE | FASTER LOADING |
| INSERT DATA INTO A COLLECTION WITHOUT VALIDATIONS | CODE | CLEAN CODE | ENSURE CLEAN, CONSISTENT, COMPLETE DATA |

FIG. 9B

| VULNERABILITY | FIX SUGGESTION | SEVERITY |
|---|---|---|
| COLLECTION CONTAINING PII WITH READ PERMISSIONS SET TO ANYONE IN EFFECT IF THEY ARE AUTOMATICALLY WITH OVER 200 RECORDS | THE COLLECTION PERMISSIONS DETERMINE WHO CAN PERFORM CERTAIN ACTIONS ON THE DATA. YOU SHOULD ALWAYS SET THE PERMISSIONS OF YOUR DATABASE COLLECTIONS TO BE AS RESTRICTIVE AS POSSIBLE | CRITICAL |
| WEB MODULES WITH PERMISSIONS ANYONE CALLED ONLY FROM SM-ONLY-PAGE | YOU CAN SET PERMISSIONS THAT DEFINE WHO CAN CALL EACH INDIVIDUAL EXPORTED WEB MODULE. BY DEFAULT PERMISSIONS ARE GRANTED TO ANYONE WITH PERMISSION TO SITE MEMBERS OR ADMIN | HIGH |
| COLLECTIONS WITH UPDATE/DELETE SET TO ANYONE | CHANGE UPDATE/DELETE OF DATA TO ADMIN OR SITE MEMBER-AUTHOR | CRITICAL |
| WEB MODULES WITH STRICT PERMISSIONS CALLING COLLECTIONS WITH LESS STRICT PERMISSIONS | FIX THE INCONSISTENCY BETWEEN THE WM AND THE COLLECTION | HIGH |

FIG. 9C

INSPECT SITE    ⊙ (MODERATION SETTINGS) (+ ADD CATEGORY)

OVERVIEW    SITE ASSETS

WEB MODULES    🔍 SEARCH

| FILE NAME | FILE ID | # OF CONCERNS | |
|---|---|---|---|
| ∧ public/client-content/content.js | public/client-content/content.js | 1 | JSW |
| ∨ public/client-utils/element-uti.js | public/client-content/content.js | 3 | JSW |
| ⊘ BE_NO_AWAIT: | public/client-content/content.js | | LINE121 |
| △ UNUSED_EXPORT:getSlotWeekDay | | | LINE12 |
| △ UNUSED_EXPORT:getSlotTime | | | LINE14 |
| ∧ public/client-content/content.js | public/client-content/content.js | 1 | JSW |
| ∧ public/client-content/content.js | public/client-content/content.js | 2 | JSW |
| ∧ public/client-content/content.js | public/client-content/content.js | 1 | JSW |

FIG. 10

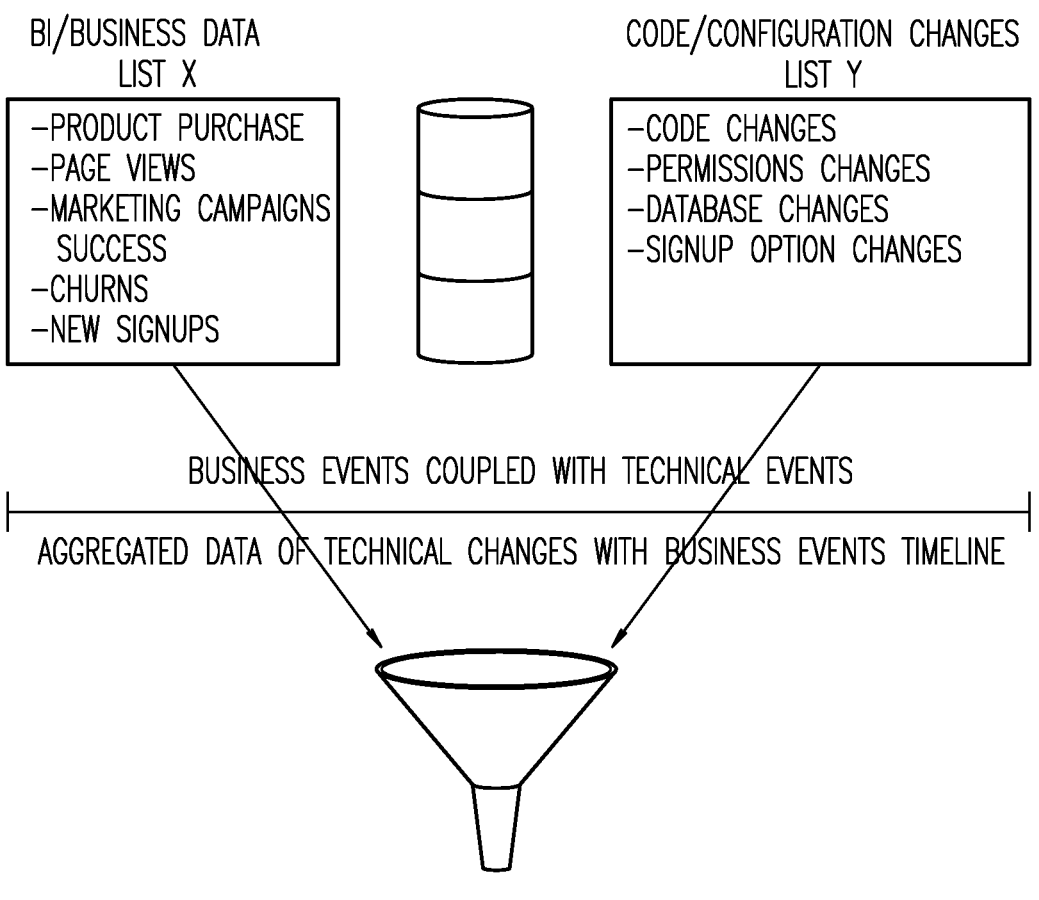

BI/BUSINESS DATA
LIST X

-PRODUCT PURCHASE
-PAGE VIEWS
-MARKETING CAMPAIGNS
 SUCCESS
-CHURNS
-NEW SIGNUPS

CODE/CONFIGURATION CHANGES
LIST Y

-CODE CHANGES
-PERMISSIONS CHANGES
-DATABASE CHANGES
-SIGNUP OPTION CHANGES

BUSINESS EVENTS COUPLED WITH TECHNICAL EVENTS

AGGREGATED DATA OF TECHNICAL CHANGES WITH BUSINESS EVENTS TIMELINE

TECHNICAL CHANGES IMPACT ON BUSINESS OPERATIONS

-PAGE X WAS REMOVED AND CAUSE CHURNS
-PERMISSIONS WAS CHANGED ON DATABASE WHICH DECREASED
 SALES PERFORMANCES ON Y LINE PRODUCT
-FAULTY PAGE CODE CAUSED VERY SHORT PAGE VIEW TIMES

FIG. 16

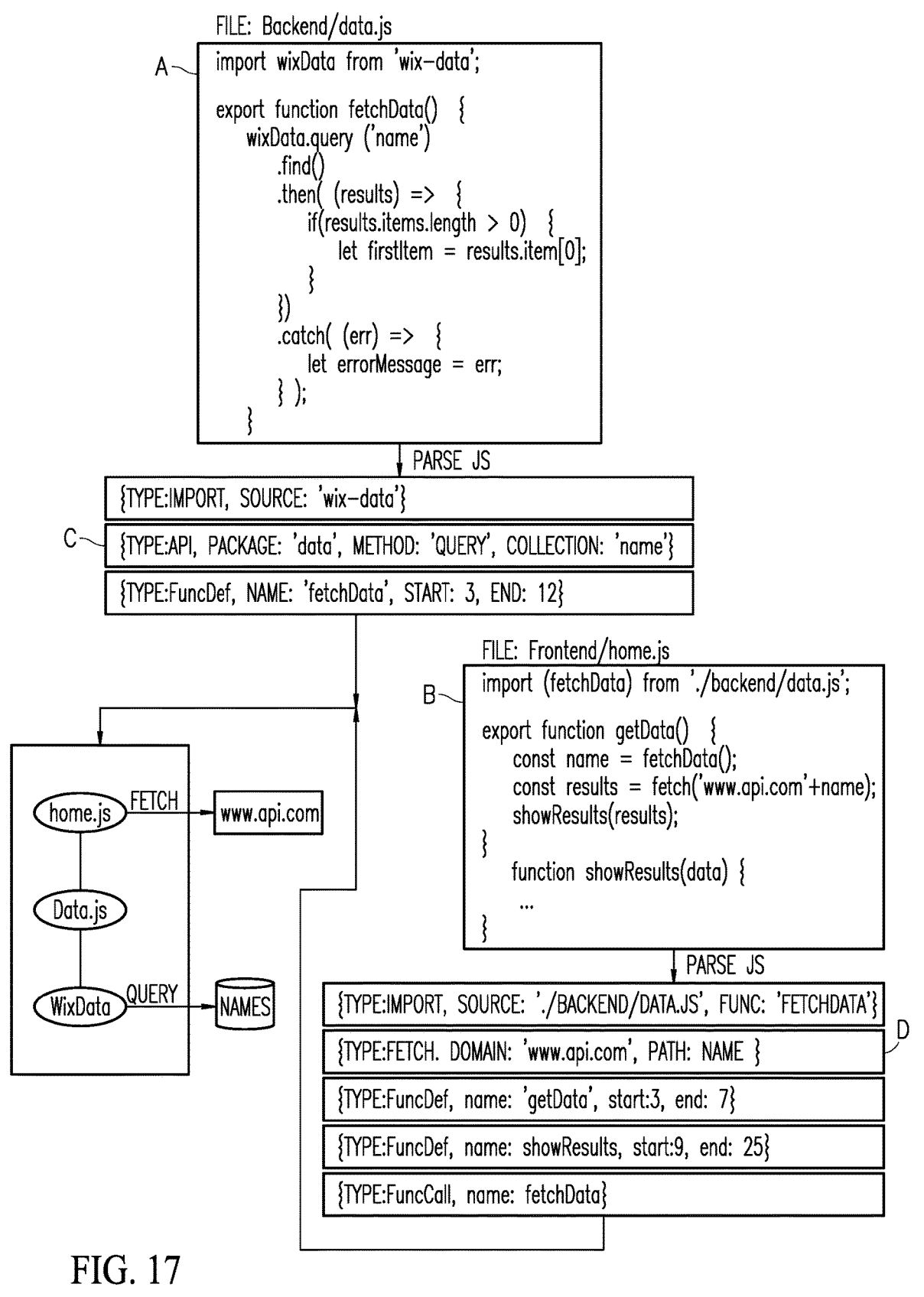

FILE: Backend/data.js

A

```
import wixData from 'wix-data';

export function fetchData()  {
    wixData.query ('name')
        .find()
        .then( (results) =>  {
            if(results.items.length > 0)  {
                let firstItem = results.item[0];
            }
        })
        .catch( (err) =>  {
            let errorMessage = err;
        } );
    }
```

PARSE JS

{TYPE:IMPORT, SOURCE: 'wix-data'}

C

{TYPE:API, PACKAGE: 'data', METHOD: 'QUERY', COLLECTION: 'name'}

{TYPE:FuncDef, NAME: 'fetchData', START: 3, END: 12}

FILE: Frontend/home.js

B

```
import (fetchData) from './backend/data.js';

export function getData()  {
    const name = fetchData();
    const results = fetch('www.api.com'+name);
    showResults(results);
} function showResults(data) {
        ...
}
``` home.js  FETCH → www.api.com

Data.js

WixData  QUERY → NAMES

PARSE JS

{TYPE:IMPORT, SOURCE: './BACKEND/DATA.JS', FUNC: 'FETCHDATA'}

D

{TYPE:FETCH. DOMAIN: 'www.api.com', PATH: NAME }

{TYPE:FuncDef, name: 'getData', start:3, end: 7}

{TYPE:FuncDef, name: showResults, start:9, end: 25}

{TYPE:FuncCall, name: fetchData}

FIG. 17

LIVE TRAFFIC EVENTS

{TYPE:PAGEVIEW, PAGE: 'home', TIMESTAMP: 12345}

{TYPE:QUERY, TABLE:PRODUCTS, RECORDS:150, DURATION: 26ms}

{TYPE:PAGEVIEW, PAGE: 'home', TIMESTAMP: 12346}

{TYPE:QUERY, TABLE:PRODUCTS, RECORDS:100, DURATION: 20ms}

{TYPE:PAGEVIEW, PAGE: 'home', TIMESTAMP: 12347}

{TYPE:QUERY, TABLE:PRODUCTS, RECORDS:20, DURATION: 5ms}

STATIC APPLICATION ARCHITECTURE DIAGRAM

AGGREGATED APPLICATION
ARCHITECTURE DIAGRAM,
TRAFFIC WEIGHTED SIZES

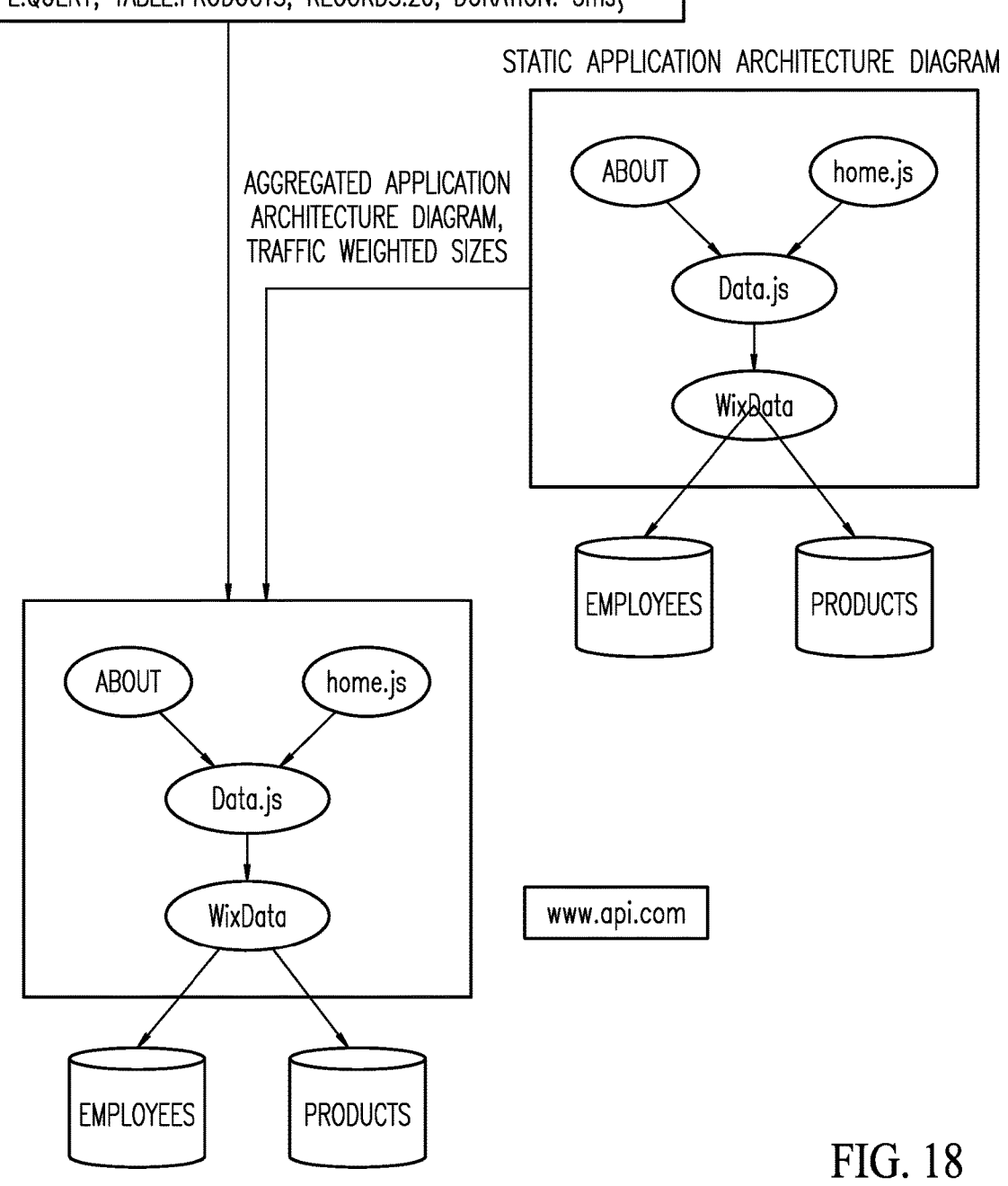

www.api.com

FIG. 18

COMPREHENSIVE COMPONENT ANALYSIS AND VISUALIZATION

CROSS REFERENCE TO RELATED APPLICATIONS

This application claims priority from U.S. Provisional Patent Application No. 63/390,408, filed Jul. 19, 2022 which is incorporated herein by reference.

FIELD OF THE INVENTION

The present invention relates to website building systems generally and to generation of application insights in particular.

BACKGROUND OF THE INVENTION

Website building systems (WBSs) are used by both novices and professionals to create interactive websites. Existing WBSs are based on a visual editing model. Most WBSs typically provide multiple templates, with a template possibly including a complete sample website, a website section, a single page or a section of a page. A website may typically combine various elements such as visual code, databases and external elements such as third party applications.

A WBS typically handles the creation and editing of visually designed applications (such as a website) consisting of elements which may include pages, containers and components. Pages may be separately displayed and contain components. Components may include containers as well as atomic components. Reference is made to FIG. 1, which is a schematic block-diagram illustration of a website building system (WBS) 2 which may be used for building a website 3, in accordance with some demonstrative embodiments of the present invention. WBS 2 may be used to build, produce, edit and/or generate website 3, which may comprise pages 4 which may further include components 5 (e.g., atomic components, container components, text, images, videos etc.).

The WBS may also support hierarchical arrangements of components using atomic components (text, image, shape, video etc.) as well as various types of container components which contain other components (e.g., regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position, attributes and other parameters). An example of the second category is a text paragraph component, whose internal content includes the internal text as well as font, formatting and layout information (which is also part of the content rather than being attributes of the component). This content may, of course, vary from one instance of the text paragraph component to another. Components which have content are often referred to as fields (e.g., a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The WBS may provide inheritance between templates, pages or components, possibly including multi-level inheritance, multiple inheritance and diamond inheritance (i.e., A inherits from B and C and both B and C inherit from D).

The visual arrangement of components inside a page is called a layout. The WBS may also support dynamic layout processing, a process whereby the editing of a given component (or other changes affecting it such as externally driven content change) may affect other components, as further described in U.S. Pat. No. 10,185,703 entitled "Website Design System Integrating Dynamic Layout and Dynamic Content" granted 22 Jan. 2019, commonly owned by the Applicant and incorporated herein by reference.

A WBS may be extended using add-on applications such as a third-party application and its components (TPAs), list applications (such as discussed in US Patent Publication No. US 2014/0282218 entitled "DEVICE, SYSTEM, AND METHOD OF WEBSITE BUILDING BY UTILIZING DATA LISTS" published 18 Sep. 2014, commonly owned by the Applicant and incorporated herein by reference) and WBS configurable applications (such as described in in US Patent Publication No. 2020/0151226 entitled "System And Method for Creation and Handling of Configurable Applications for Website Building Systems" published 14 May 2020 and issued as U.S. Pat. No. 11,698,944 on Jul. 11, 2023, commonly owned by the Applicant and incorporated herein by reference). These third-party applications and list applications may be added and integrated into designed websites.

Such third-party applications and list applications may be purchased (or otherwise acquired) through a number of distribution mechanisms, such as being pre-included in the WBS design environment, from an Application Store (integrated into the WBS's market store or external to it) or directly from the third-party application vendor.

The third-party application may be hosted on the WBS vendor's own servers, the third-party application vendor's server or on a 4th party server infrastructure.

A WBS may be a standalone system, or may be embedded inside a larger editing system. It may also be on-line (i.e., applications are edited and stored on a server), off-line or partially on-line (with web sites being edited locally but uploaded to a central server for publishing). The WBS may use an internal data architecture to store WBS based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO [search engine optimization] related information etc.) which are relevant for the editing and maintenance of the site in the WBS, but are not externally visible to end-users (or even to some editing users). The WBS may implement some of its functionality (including both editing and run-time functionality) on a server or server set, and some of its functionality on client elements. The WBS may also determine dynamically whether to perform some functionality on the server or on the client platform.

WBS users (also known as designers, subscribers, subscribing users, or site editors) may design the website, and the website's end-users (the "users of users") may access the websites created by the users. Although end-users typically access the system in read-only mode, WBSs (and websites) may allow end-users to perform changes to the website, such as adding or editing data records, adding talkbacks to news articles, and adding blog entries to blogs, etc. The WBS may in fact allow multiple levels of users (i.e., more than two levels), and assign different permissions and capabilities to each level. Users of the WBS (in particular in the full or partial on-line configurations described below) may register in the WBS server, which manages the users, their websites and accesses by the end-users.

The WBS may also allow procedural code to be added to some or all of the system's elements. Such code could be written in a standard language (such as JavaScript), an extended version of a standard language or a language proprietary to the specific WBS. The executed code may reference application programming interfaces (APIs) provided by the WBS itself or external providers. The code may also reference internal constructs and objects of the WBS, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions. The use of such procedural code elements is further described in U.S. Pat. No. 10,209,966 entitled "Custom Back-End Functionality in an Online Website Building Environment" granted 19 Feb. 2019, commonly owned by the Applicant and incorporated herein by reference.

The activated code may be executed inside the WBS's client element, on the server platform or by using a combination of the two or a dynamically determined execution platform. Such a system is described in U.S. Pat. No. 11,449,573 entitled "System and Method for Smart Interaction Between Website Components" granted 20 Sep. 2022, commonly owned by the Applicant and incorporated herein by reference.

Typical site creation may be based on a number of models, including a visual editing model (in which the user edits a previously created site) and an automatic site generation model or a combination thereof as illustrated in FIG. 2 to which reference is now made and is described in U.S. Pat. No. 10,073,923 entitled "System and Method for the Creation and Update of Hierarchical Websites Based on Collected Business Knowledge" granted 11 Sep. 2018, commonly owned by the Applicant and incorporated herein by reference.

It will be appreciated that throughout the specification, the acronym WBS may be used to represent a website building system. FIG. 2 illustrates a system 100 that comprises a typical WBS 2 in communication with client systems operated by WBS vendor staff 61, a site designer 62 (i.e., a user), a site user 63 (i.e., user of user/end user) and with external systems 70. WBS 2 may further comprise a WBS site manager 10, an object marketplace 15, a WBS RT (runtime) server 20, a WBS editor 30, a site generator system 40 and a WBS content management system (CMS) 50. It will be appreciated that the elements of FIG. 2 may function as described in U.S. Pat. No. 10,073,923.

In the visual editing model, the user (designer) edits a site based on one or more website templates. The WBS provider may provide multiple site (or other) templates, with each template possibly including a complete sample web site, a web site section, a single page or a section of a page. Users may have the option to start with an empty site (essentially a "blank page" template) but would typically start with an actual site template.

The WBS provider may provide site templates ranging from the very generic (e.g., mobile site, e-store) through the more specific (e.g., law office, restaurant, florist) to the highly specific ones (e.g., a commercial real-estate law office or a Spanish tapas restaurant). Such templates are typically stored in a repository accessible to users of the WBS and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the WBS.

Thus, the user's first experience when creating a site using a WBS visual editor may typically be that the user chooses a template (e.g., according to style or industry type/sub-type), possibly a blank template and then edits the template in the visual editor including the editing of content, logic, layout and attributes. Such editing may include (in particular) adapting the template and its elements to the details of the user's business. The user may then publish the modified site.

Under the site generation model, the WBS generates an initial site for the user, based on a selected template, possibly modified by filling in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g., a generic product page) may appear multiple times, with each instance displaying the details of a different instance of an underlying entity (e.g., different products offered in the site). Such multiple instances may be manually specified (e.g., the details of different persons in the company's management team) or dynamically derived from an external database (e.g., product details from the "products on sale" database). Such an arrangement is often known as a "repeater".

The template may also include fields. For example, the WBS may allow the template designer to specify fields (also known as "placeholders") for the insertion of values inside the templates, such as {CompanyName}, {ProductName}, {ProductPrice} etc. The user may also specify the values for the fields defined in the template selected for the website.

The WBS may allow the user to enter simple or complex values (e.g., text and images), as well as additional (non-field) information such as selection of included pages or web site areas, colors, style information, links, formatting options, website display options, decoration elements (such as borders and backgrounds) etc.

The WBS may also allow the user to enter some of this additional information before selecting a template, and use this information to help in selecting a template (e.g., by narrowing the set of proposed templates). For example, the user may select a certain generic color scheme (e.g., pastel colors) or style (e.g., business/formal), and the system may then use this selection to narrow the set of proposed templates.

The WBS may also display a series of views or questionnaires to allow the user to enter values or selections (for both the defined fields and the additional information above). It may further create a connection (or binding) between a multiple-instance element of the template (as described herein above) and an internal or external database which provides the data instances used to generate the displayed instances.

Once a template has been selected and its fields and additional information have been specified (e.g., through the questionnaires or through binding to data sources), the WBS may generate the website containing the combined information. The user may then publish the site (through the WBS or otherwise).

A WBS may also support SEO review for application constructed in the WBS, as discussed in U.S. Pat. No. 11,314,837 entitled "Website Builder with Integrated Search Engine Optimization Support" granted 26 Apr. 2022, commonly owned by the Applicant and incorporated herein by reference.

A WBS may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g., distinguishing between real-estate lawyers and personal injury lawyers).

The WBS may also gather external information from other sites, both internal and external to the system. Such information may affect, for example, the selection of offered questionnaires and layout elements, proposed defaults etc. Such information may also typically be collected on a statistical or summary basis, in order not to expose information belonging to any single user, and protect users' privacy, anonymity and legal rights (such as copyrights). Such information may be located based on information provided by the user which may be direct (e.g., an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic, i.e., including user interaction.

To support the functionality mentioned above, a WBS will typically maintain a series of repositories, stored over one or more servers or server farms. Such repositories may typically include various related repositories such as a user information/profile repository, a WBS (WBS) component repository, a WBS site repository, a Business Intelligence (BI) repository, an editing history repository, a third-party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

SUMMARY OF THE PRESENT INVENTION

There is provided, in accordance with a preferred embodiment of the present invention, a website building system (WBS) including at least one hardware processor and a component analysis and visualization (CCAV) module running on the at least one hardware processor to analyze elements of an underlying application built using the WBS and to generate a visual system architecture diagram (SAD) representing the hierarchical arrangement of the elements. The CCAV module includes a site object build engine to gather and analyze information on the elements and to create a site object representation for the underlying application, a software bill of materials builder to create a software bill of materials from the site object consisting at least of assets and configuration data for the underlying application and a SAD renderer to create and display the SAD where the SAD includes a static application architecture diagram representing the at least assets and configuration data and an aggregated application architecture diagram showing an overlay of at least one of: software, hardware usage, and business data changes affecting the underlying application.

Moreover, in accordance with a preferred embodiment of the present invention, the at least assets include at least one of: site code, user code, dependency code, and metadata and attributes for the underlying application.

Further, in accordance with a preferred embodiment of the present invention, the system also includes a rule analysis engine to provide and execute validation rules for the site object build engine and a CCAV editor to enable a user of the WBS to modify the underlying application according to the static application architecture diagram and the aggregated application architecture diagram.

Still further, in accordance with a preferred embodiment of the present invention, the system includes an evaluation engine to evaluate and make recommendations for the underlying application.

Additionally, in accordance with a preferred embodiment of the present invention, the site object build engine includes at least one of: an ID (identification) receiver to receive an ID for the underlying application and to retrieve the at least assets and configuration data for the underlying application according to the ID, an asset edge creator to create asset edges by automatically breaking the user code and the dependency code into functions, methods, and their internal components; an asset correlator to perform cross asset correlations according to the metadata and attributes to identify iterable references across different asset types; a data scanner to scan tables of databases used by the underlying application; a data set generator to generate the site object, a database coordinator to coordinate between the site object build engine and at least one database of the WBS; and an application identifier to identify applications with the WBS with similar structures and patterns to the underlying application to enable code reuse.

Moreover, in accordance with a preferred embodiment of the present invention, the data scanner includes a problem identifier to identify problem types within the underlying application; an anomaly detector to identify anomalies within the underlying application that do not fall under the problem types; and a data cleaner to apply data cleansing methodologies to the metadata.

Further, in accordance with a preferred embodiment of the present invention, the rules analysis engine includes at least one of: a code analyzer to implement code validation rules for the site code, the user code and the dependency code; a code validator to validate results of the code analyzer; an alert creator to create an alert if an anomaly is found by the anomaly detector; an ML (machine learning) engine to build, operate and train ML models for the CCAV module; a rule validator to validate the validation rules for the code analyzer; a rule engine to create and execute the code validation rules, where the rule engine further includes a rule creator to enable at least one of manual and automatic creation of the validation rules according to the at least assets; and an improper permissions detector to identify anomalies in data access to the underlying application by its end users.

Still further, in accordance with a preferred embodiment of the present invention, the improper permissions detector includes a traffic identity recognizer to recognize the end users accessing the underlying application; and a permission recognizer to detect permission misconfigurations for the end users.

Additionally, in accordance with a preferred embodiment of the present invention the SAD renderer includes a SAD builder to create the aggregated application architecture diagram from information gathered externally and internally to the WBS; a graph creator to integrate the aggregated application architecture diagram as a dynamic dimension within the SAD display; and a map renderer to render the SAD display.

Moreover, in accordance with a preferred embodiment of the present invention, the SAD builder includes an SAD data gatherer to gather data internal and external to the WBS and to ensure privacy, anonymity, and copyright protection; an SAD analyzer to analyze data collected by the SAD data gatherer to provide comparative data to data of the current underlying application; an SAD correlator to correlate changes to the elements between the static application architecture diagram and the aggregated application architecture diagram; and an SAD segmentor to segment the results of the SAD analyzer according to user segments.

Further, in accordance with a preferred embodiment of the present invention, the underlying application is at least one of: a website, a native desktop application, a mobile application, an embedded software, and an application embedded within or which are a part of a larger system or platform.

Still further, in accordance with a preferred embodiment of the present invention, the at least assets further comprise at least one of: content collections, databases, permissions, site registration configuration, cloud configuration, libraries and API's (application programming interface).

Additionally, in accordance with a preferred embodiment of the present invention, the user segments are based on at least one of: geography, user class or types, underlying application parameters, underlying application templates, editing history and business information.

Moreover, in accordance with a preferred embodiment of the present invention, the overlay is at least one of: one or more display overlays, a combined information display, multiple display tabs and a 3D display.

Further, in accordance with a preferred embodiment of the present invention, the elements comprise at least one of: pages, containers and components, visual code, databases, third party applications, content elements, layout elements, non-visible objects, back-end objects and auxiliary objects.

There is provided in accordance with a preferred embodiment of the present invention, a method for a website building system. (WBS), the method includes analyzing elements of an underlying application built using the WBS and generating a visual system architecture diagram (SAD) representing the hierarchical arrangement of the elements, the analyzing and generating further including gathering and analyzing information on the elements to create a site object representation for the underlying application; creating a software bill of materials from the site object consisting at least of assets and configuration data for the underlying application; and creating and displaying the SAD where the SAD includes a static application architecture diagram representing the at least assets and configuration data and an aggregated application architecture diagram showing an overlay of at least one of: software, hardware usage, and business data changes affecting the underlying application.

Moreover, in accordance with a preferred embodiment of the present invention, the at least assets include at least one of: site code, user code, dependency code, and metadata and attributes for the underlying application.

Further, in accordance with a preferred embodiment of the present invention, the method includes providing and executing validation rules for the gathering and analyzing; and enabling a user of the WBS to modify the underlying application according to the static application architecture diagram and the aggregated application architecture diagram.

Still further, in accordance with a preferred embodiment of the present invention, the method includes evaluating and making recommendations for the underlying application.

Additionally, in accordance with a preferred embodiment of the present invention, the gathering and analyzing includes at least one of: receiving an ID (identification) for the underlying application and retrieving the at least assets and configuration data for the underlying application according to the ID, creating asset edges by automatically breaking the user code the dependency code into functions, methods, and their internal components; performing cross asset correlations according to the metadata and attributes to identify iterable references across different asset types; scanning tables of databases used by the underlying application; generating the site object; coordinating between the gathering and analyzing and at least one database of the WBS; and identifying applications with the WBS with similar structures and patterns to the underlying application to enable code reuse.

Moreover, in accordance with a preferred embodiment of the present invention, the scanning tables includes identifying problem types within the underlying application; identifying anomalies within the underlying application that do not fall under the problem types; and applying data cleansing methodologies to the metadata.

Further, in accordance with a preferred embodiment of the present invention, the providing and executing validation rules includes at least one of: implementing code validation rules for the site code, the user code and the dependency code; validating results of the implementing; creating an alert if an anomaly is found by the identifying anomalies; building, training and operating ML (machine learning) models for the CCAV module; validating the validation rules for the implementing code validation rules; creating and executing the code validation rules, where the creating includes enabling at least one of manual and automatic creation of the validation rules according to the at least assets; and identifying anomalies in data access to the underlying application by its end users.

Still further, in accordance with a preferred embodiment of the present invention, the identifying anomalies in data access includes recognizing the end users accessing the underlying application; and detecting permission misconfigurations for the end users.

Additionally, in accordance with a preferred embodiment of the present invention, the creating and displaying the SAD includes creating the aggregated application architecture diagram from information gathered externally and internally to the WBS; integrating the aggregated application architecture diagram as a dynamic dimension within the SAD display; and rendering the SAD display.

Moreover, in accordance with a preferred embodiment of the present invention, the creating the aggregated application architecture diagram includes gathering data internal and external to the WBS and ensuring privacy, anonymity, and copyright protection; analyzing data collected by the gathering data internal and external to the WBS to provide comparative data to data of the current underlying application; correlating changes to the elements between the static application architecture diagram and the aggregated application architecture diagram; and segmenting the results of the analyzing data collected according to user segments.

Further, in accordance with a preferred embodiment of the present invention, the underlying application is at least one of: a website, a native desktop application, a mobile application, an embedded software, and an application embedded within or which are a part of a larger system or platform.

Still further, in accordance with a preferred embodiment of the present invention, the at least assets further include at least one of: content collections, databases, permissions, site registration configuration, cloud configuration, libraries and API's (application programming interface).

Additionally, in accordance with a preferred embodiment of the present invention, the user segments are based on at least one of: geography, user class or types, underlying application parameters, underlying application templates, editing history and business information.

Moreover, in accordance with a preferred embodiment of the present invention, the overlay is at least one of: one or more display overlays, a combined information display, multiple display tabs and a 3D display.

Further, in accordance with a preferred embodiment of the present invention, elements comprise at least one of: pages, containers and components, visual code, databases, third party applications, content elements, layout elements, non-visible objects, back-end objects and auxiliary objects.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 9A, 9B and 9C are illustrations of code and performance rules used by the rule analysis engine of FIGS. 4A and 4B, constructed and operative in accordance with the present invention, FIG. 9A is spread out over 2 pages marked as 9A-1 and 9A-2;

FIG. 10 is a schematic illustration of example code concerns detected by the rule analysis engine of FIGS. 4A and 4B, constructed and operative in accordance with the present invention;

FIG. 16 is a schematic illustration of how application changes, business and other key performance indicators may be correlated by the SAD correlator of FIG. 15, constructed and operative in accordance with the present invention;

FIG. 17 is a schematic illustration of how a system architecture diagram is constructed from the software bill of materials as provided by the software bill of materials builder of FIGS. 4A and 4B, constructed and operative in accordance with the present invention;

FIG. 18 is a schematic illustration of changes to live traffic events may be added to the static application architecture diagram to produce an aggregated application architecture diagram, constructed and operative in accordance with the present invention;

Figure 1:
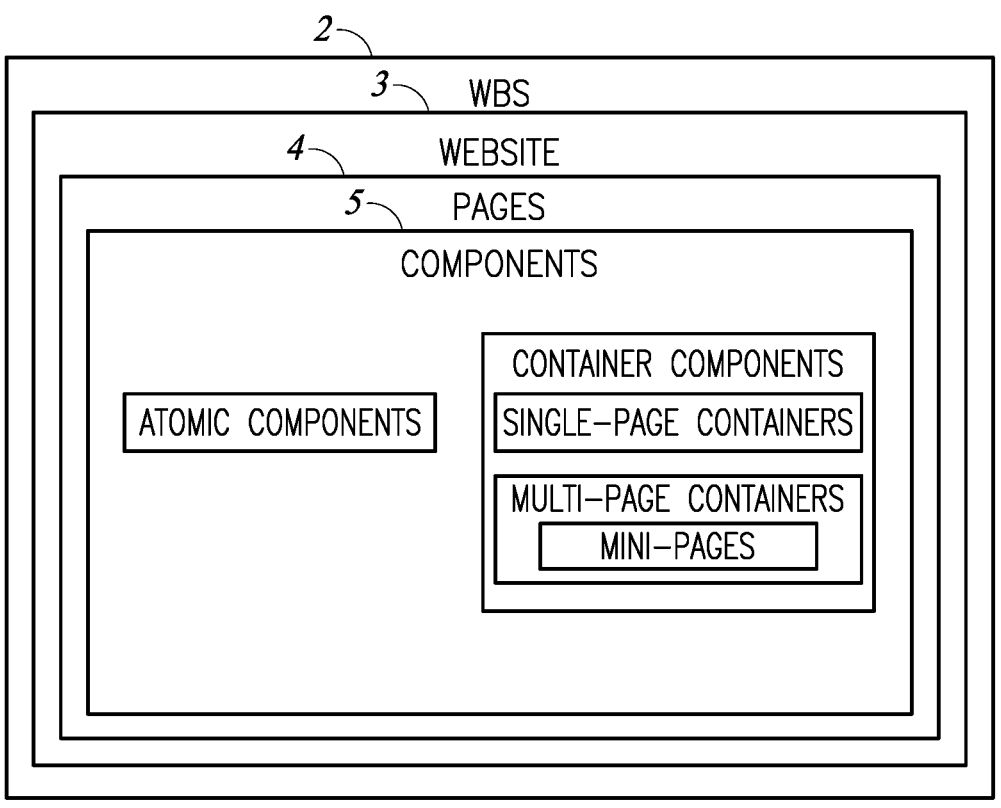
FIG. 1 is a schematic illustration of a typical representation of a website building system of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that as software applications and systems become more complex, keeping control of all an application's elements may become increasingly challenging. To build and maintain a successful and secure application, the application owner (i.e., WBS user) needs to understand the overall system architecture and consider its diverse aspects such as real-time system performance, cost of and revenues generated by system elements, system security and interfaces with other systems (both providing and integrating APIs (application programming interfaces) to/from external systems).

The application elements may interact with each other and may have complex interdependencies and side-effects. For example, the use of a new API from a 3rd-party provider can generate more revenues but may also cost additional fees and create a new security vulnerability.

For the sake of the discussion herein below, the term component may refer to visual objects of the website/site application (such as text, images and buttons etc.) The term element may refer to all possible elements of the website including non-visible objects, back-end objects, auxiliary objects etc. The term entity may refer to other related parts, not necessarily parts of the website.

In addition to integrating information from many different sources, the user may need a way to perform end-to-end analysis and monitoring of flows in the application. For example, adding Personally Identifiable Information (PII) to an existing table (to address a business need) could create a risk of a data leak or violating applicable legal regulations (such as CCPA (California Consumer Privacy Act), GDPR (General Data Protection Regulation.) etc., if the application owner does not have a clear way of figuring out all the usage flows that can reach the table.

Applicant has realized that a solution for a user to keep control of the entities of his application is the ability to build and maintain applications through the use of a comprehensive component analysis and visualization (CCAV) module which may integrate comprehensive analysis of the elements and related entities of the application, tracking, data integration, component correlation, visualization, and editing of websites or applications to build a site object or collection of all the elements and entities used to create the application together with their metadata such as number of records, size, ID, type of data, permissions etc. This could include displaying information about the various software and hardware components and interfaces to third-party systems that are used in building and running the software application. It also allows the user to manipulate those components in the context of a high-level application overview, allowing for better control and understanding of the change process.

The module may utilize and integrate information from multiple sources (such as software code, business data, live traffic data, database size, and query stream data) to enhance the user's ability to control and optimize the application for technical and business metrics. Such metrics may include stability, security, responsiveness, cost, profitability, etc.

Figure 2:
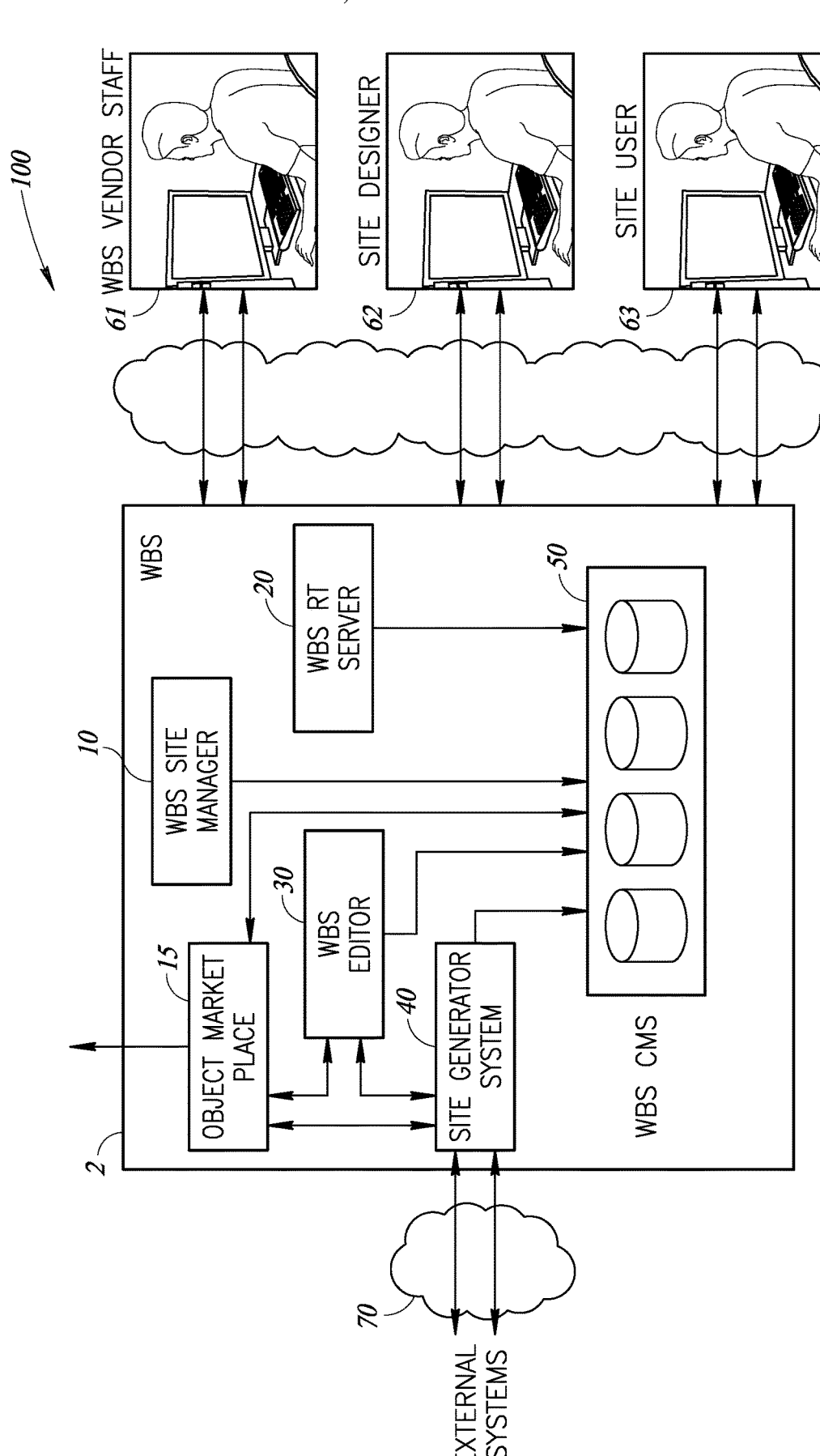
FIG. 2 is a schematic illustration of a system for the creation and update of hierarchical websites.
Figure 3:
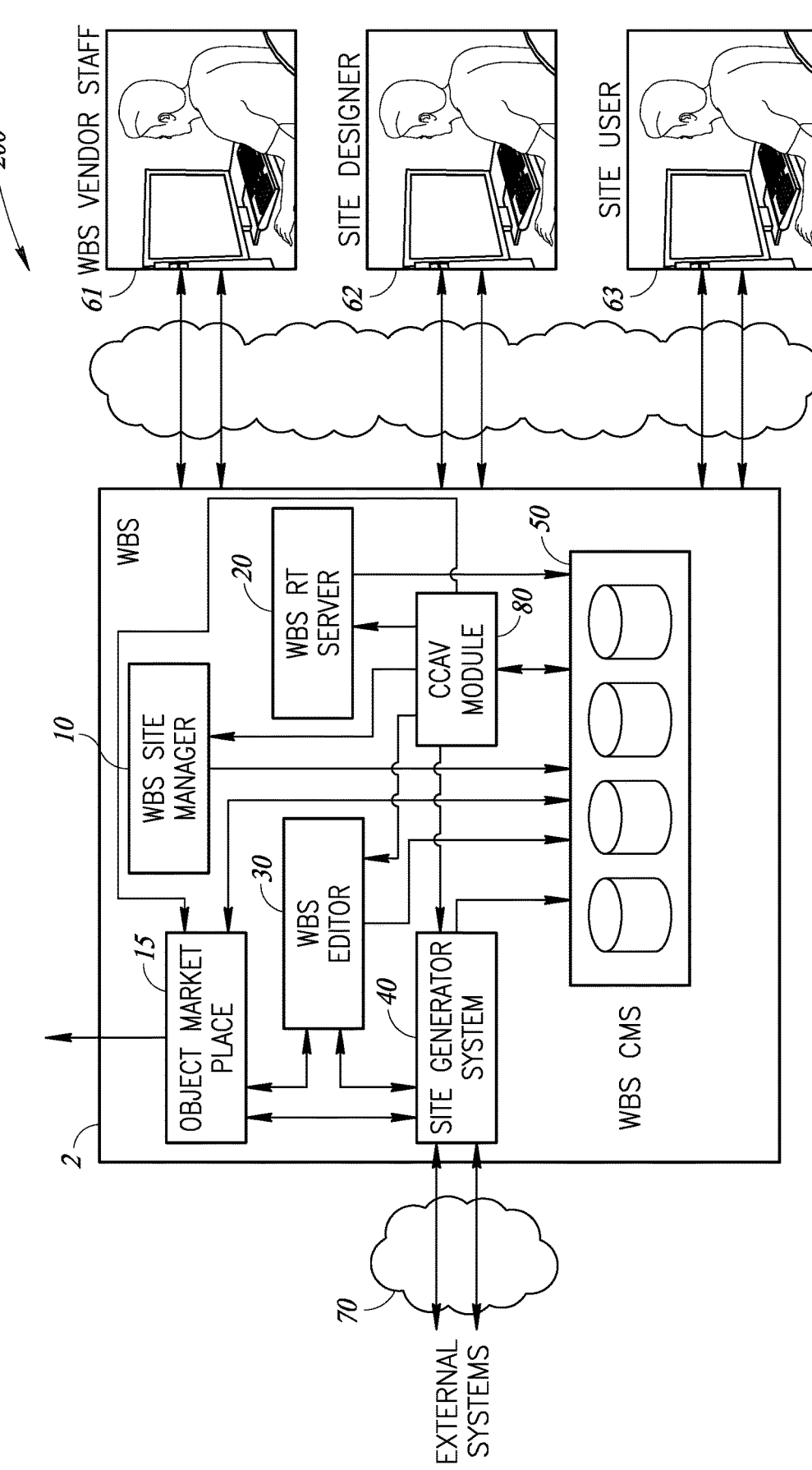
FIG. 3 is a schematic illustration of a component analysis and visualization (CCAV) module integrated with the system of FIG. 2, constructed and operative in accordance with the present invention.

Reference is now made to FIG. 3 which illustrates a system 200 comprising a CCAV module 80 integrated with the WBS 100 of FIG. 2 according to an embodiment of the present invention.

It will be appreciated that for the discussion below, the description shall refer to the application or system being analyzed and tracked as the underlying application.

CCAV module 80 may handle an underlying application implemented as a complex website. Such a complex website may integrate display, databases, web services, third-party components, and front-end and back-end code (as described in U.S. Pat. No. 10,209,966).

It will be further appreciated that embodiments of CCAV module 80 may also handle underlying applications implemented using other technologies and platforms. For example, the technologies may include separate WBSs (not integrated with CCAV module 80), native desktop applications, mobile applications, embedded software, applications embedded within or which are a part of a larger system or platform, and other technologies.

CCAV module 80 may also be implemented as a stand-alone product, system, subsystem, embedded module, software as a service (SaaS), or using other technologies.

The user description herein may refer to the WBS user, the application owner, the organization, person, or persons using CCAV module 80 to gather information, present and act on it. Such references should be read to include other such operators, such as application developers, those operating on behalf of the application owner or automated modules or bots operating CCAV module 80 to achieve required results. The application owner may also be referred to as a CCAV module 80 user.

It will be appreciated that CCAV module 80 may consist of a set of application elements and system endpoints that may provide a comprehensive view of software application solutions, covering the application code, configuration, databases, and external services it uses. For example, for a given underlying application (e.g., based on an application identifier) CCAV module 80 may dissect code blocks, functions and other code elements in the application's code objects, identify code and usage relations (by means of import/include etc.) across various code segments (backend to frontend, frontend to public, etc.) and identify services served by the underlying application (such as web modules, HTTP functions, web services, etc.). It may also provide the ability to identify related and unrelated metadata across services to build detailed WBS object structures, such as permissions applied to a database A that is consumed by a web service B, or a library (e.g., Software Development Kit or Package) Y used in a web service Z that contains a vulnerability, a bug, a performance problem, a crash, or a security breach.

CCAV module 80 may also identify performance and security concerns based on flaws in common and non-common code (both WBS-specific and non-WBS-specific) and also analyze site assets, configuration data and elements, including code and non-code assets (site code, user code and dependency code), such as content collections, databases, permissions, site registration configuration, cloud configuration, libraries used in code, etc. The analysis may also include parsing permissions attributes of assets (such as pages, databases, APIs). It may further analyze the layout and other visual elements of the website or application, including their dynamic aspects (e.g., animations, what displays appear when). This could be used, for example, to deduce the importance allocated to different sections of the application's visual display.

Another function of CCAV module 80 may be to build a system architecture diagram (SAD) from code and non-code objects to enable the user to visualize application and business flows and then to enhance the SAD with live/ historical traffic and business data as an overlay to let the user focus on the system elements that are most important or need urgent maintenance. It will be appreciated that the aggregated presentation may be created using one or more display overlays, using combined information display, using multiple display tabs, using 3D displays or using other techniques. For the sake of clarification, for the examples given, the added information may be referred to as an overlay, although different embodiments of the invention may use additional aggregation, display, and presentation techniques. Thus, CCAV module 80 may display information obtained from various sources as an aggregated application architecture diagram as described in more detail herein below. This is useful to understand the impact of multiple concerns and prioritize development and resource acquisition for the application.

CCAV module 80 may also handle application concerns by identifying and displaying problems with the site code, data, security, and configuration, including using site live BI (business intelligence) data when available as well as identifying business concerns that may derive from the code base or configuration by correlating changes in BI metrics defined by the user to changes in the application code or configuration.

At a lower level, CCAV module 80 may provide a comprehensive list of application-related concerns such as coding concerns and file level-code concerns that can be detected in the context of a single file, like multiple definitions of an event handler. It may also identify coding concerns at site-level and coding concerns that can be detected in the full application context, like exporting a function that is never used.

Furthermore, CCAV module 80 may identify security concerns by considering the different states of one or more resources of the application. The state of resources may include secure coding in front-end and back-end code such as input validation, hard-coded secrets, usage of 3rd party code and 3rd party API calls, error handling, information disclosure, and more.

CCAV module 80 may also determine permission configuration for APIs serving the website as well as the usage of security tools such as monitoring tools and dedicated secret storage.

CCAV module 80 may further assess search engine configurations. For example, CCAV module 80 may search using an AI engine like Chat GPT commercially available from OpenAI. This configuration may create an NLP (natural language processing) interface for searching and querying a system integrating CCAV module 80. It will be appreciated that for this scenario CCAV module 80 may use a plugin or an external AI (artificial intelligence) agent.

CCAV module 80 may also handle database configurations, value types, PII recognition, usage of 3rd party API HTTP (Hypertext Transfer Protocol) elements such as request methods, headers, query params response headers.

CCAV module 80 may identify anomalies in the detection of traffic as well as anomalies such as detection of concerns in the databases used by the application, tables that are not mentioned in the code, data that is never read/updated by the application, missing values, type-mismatch concerns, and abnormal/suspicious values.

CCAV module 80 may also provide a comprehensive list of site assets, including databases, libraries, APIs, configuration, and metadata as a software bill of materials. By reviewing these assets in a centralized repository (such as CMS 50), it is easier to identify cross-functional dependencies, and relations and better plan for future development, and identify possible concerns that may arise when the application, its configuration, or data changes.

CCAV module 80 may display the components that are used to build up the underlying application such as hardware resources (physical or virtual), database tables, 3rd-party services, backend code, internal and external libraries, front-end pages (including information about all the UI components that are used in the frontend). This may allow the user to see the broad picture and full context of the applications when they plan and execute modifications to existing components, the addition of new components, or the deletion of existing ones.

The creation of a software bill of materials may assist in development collaboration, handoff of software solutions, and in gaining insights from the reviewed web application which may be applied to other solutions.

Figure 4A:
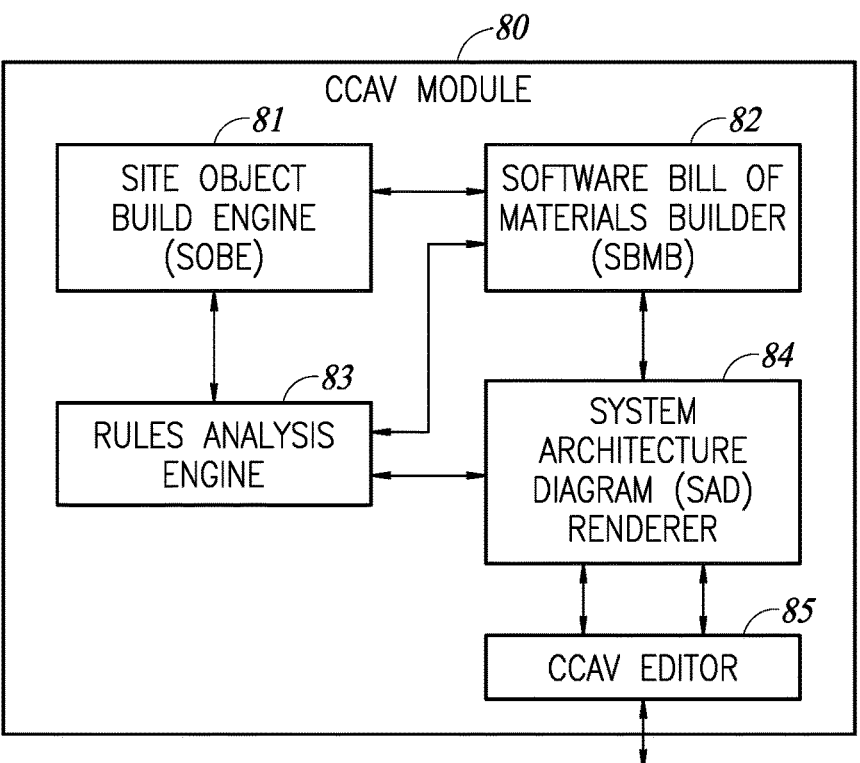
FIG. 4A is a schematic illustration of the elements of the CCAV module of FIG. 3; constructed and operative in accordance with the present invention.

Reference is now made to FIG. 4A which illustrates the elements of CCAV module 80. CCAV module 80. CCAV module may comprise a site object build engine (SOBE) 81, a software bill of materials builder (SBMB) 82, a rule analysis engine (RAE) 83, a SAD (system architecture diagram) renderer 84 and a CCAV editor 85. It will be appreciated that the elements of CCAV module 80 may use information stored in CMS 50 as described herein above.

Figure 4B:
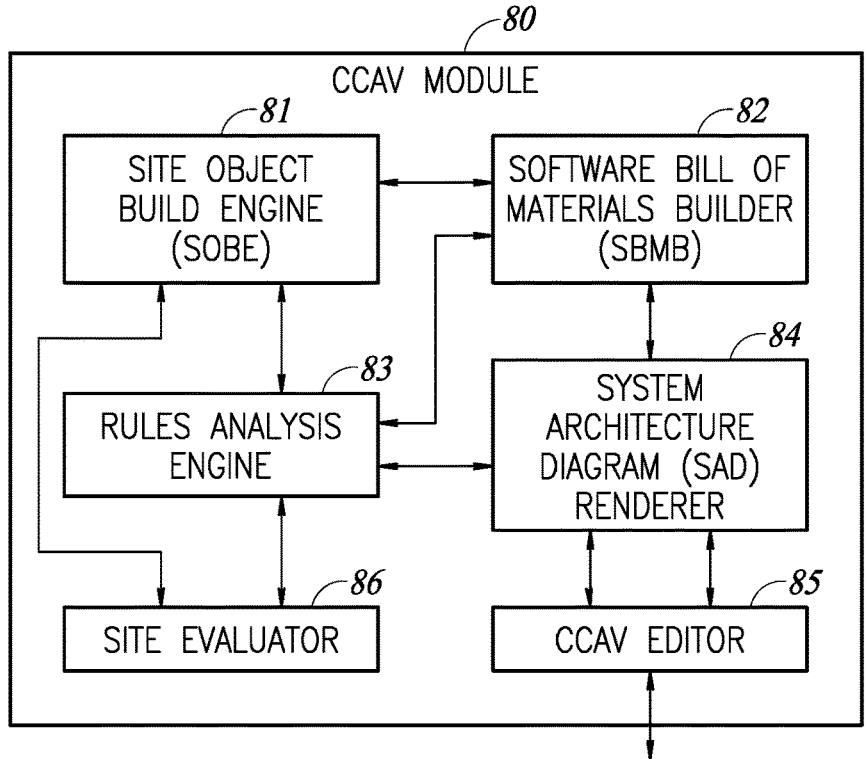
FIG. 4B is a schematic illustration of an alternative embodiment of the elements of the CCAV module of FIG. 3; constructed and operative in accordance with the present invention.

In an alternative embodiment, as is illustrated in FIG. 4B to which reference is now made. CCAV module 80 may further comprise site evaluator 86 equivalent to site evaluator 80 as described in US Patent Publication No. US 2022/0229970 entitled "Multi-Faceted Site Evaluator Integrating User Defined Evaluation Engines" published Jul. 21, 2022, commonly owned by the Applicant and incorporated herein by reference. Site evaluator 86 may use multiple evaluation engines to evaluate and make recommendations regarding the underlying application. It will be appreciated that in this embodiment, recommendations may be offered via WBS editor 30 or any other suitable user interface which also may allow for the user to act on them.

The sub elements of CCAV module 80 may utilize multiple internal flows to analyze and generate application insights, as described in more detail herein below.

SOBE 81 may be responsible for fetching information such as user code, site configuration, related assets, and more data to build the site object as well as cleaning up and detecting and fixing anomalies. This information is then used by SBMB 82 to create the software bill of materials for the underlying application, which may consist of code, data, and configuration data as described in more detail herein below. The site object may also include the site assets (and their metadata) in an iterable form that may later be used to build relations on top of a graph and in table formats in order to present which collection/3rd party API/function/code library/event/are used in each code file/function/page/event.

Figure 5:
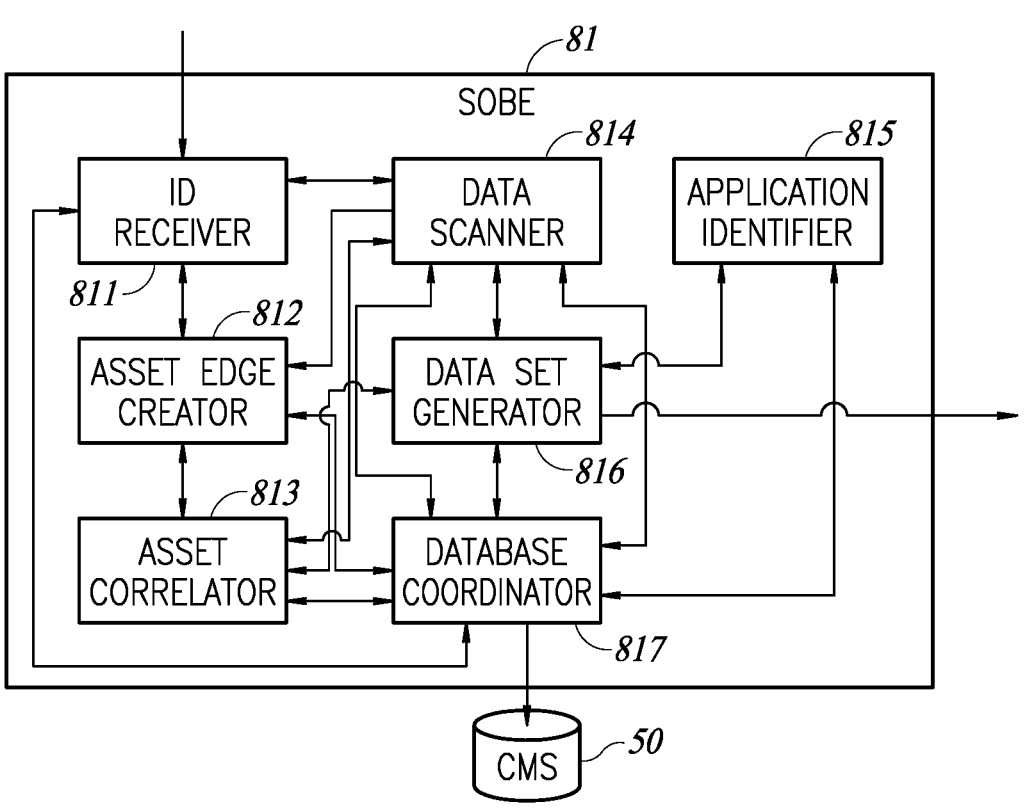
FIG. 5 is a schematic illustration of the elements of the software bill of materials builder (SBMB) of FIGS. 4A and 4B, constructed and operative in accordance with the present invention.

Reference is now made to FIG. 5 which illustrates the sub elements of SOBE 81. SOBE 81 may further comprise an ID (identification) receiver 811, an asset edge creator 812, an asset correlator 813, a data scanner 814, an application identifier 815, a data set generator 816, and a database coordinator 817.

For a typical flow, ID receiver 811 may accept an underlying site's unique ID, which triggers a series of calls to external and internal system endpoints that provide the site code, configuration data, and metadata for the site in question. Such calls may use different communication or transport mechanisms (including both inter- and intra-system techniques).

Based on the information fetched by ID receiver 811, asset edge creator 812 may create asset edges (relations) by automatically breaking user code into functions, methods, and their internal components. Relation types may include (for example) calling a function from another file, accessing a DB (database) table from code, connections between DB tables (for example, represented as usage of foreign keys or other form of links), invoking third-party APIs, invocation of batch tasks by a mechanism such as CRON (a job scheduler for Linux/Unix like operating systems).

Asset correlator 813 may then perform cross asset correlations, based on metadata and attributes to identify iterable references across the different asset types. Asset correlator 813 may find and record relationships in the data references from the different asset types. This can be done in ways known in the art such as parameters to variables, operations (such as SQL) on tables and other structures and metadata to data. Asset correlator 813 may also define the kind of relationship between two assets, whether it is directional or bi-directional, its relative frequency or whether a conversion involved on the way, such as when two assets are connected using Kafka (a distributed event store and stream-processing platform provided by the Apache Software Foundation).

It will be appreciated that problems with user data may cause suboptimal users of users (UoU) experience and potential financial loss to users. An example is a user typing the wrong date when making a booking reservation. Typically, WBSs have many mechanisms to deal with this such as data hooks and input validations, as well as built-in checks. However, the users (who design the application or website) do not necessarily use them. Some of the UoU errors are subtle (e.g., booking a hotel room for a date far in the future), and some users do not implement the relevant data validation tests.

Data scanner 814 may scan the database tables from CMS 50 that are used by the underlying application in order to identify concerns in the data that may cause the application to malfunction, and report such potential data quality concerns.

Figure 6:
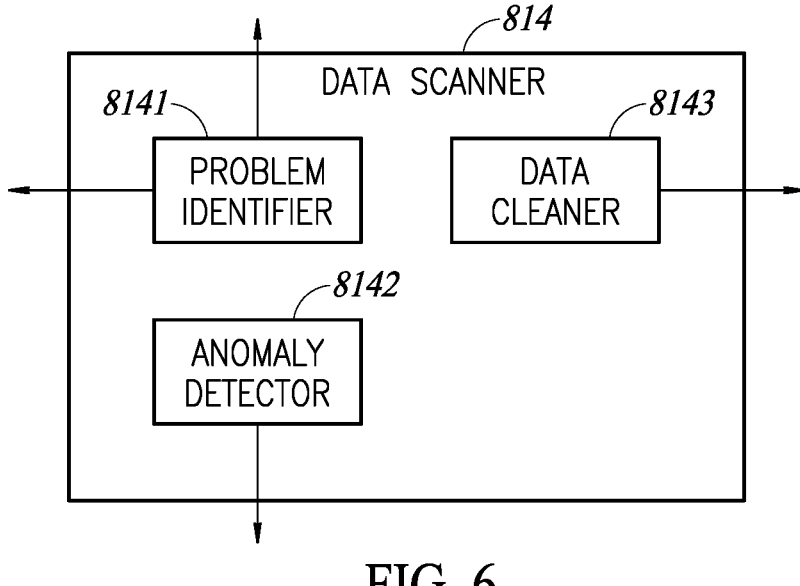
FIG. 6 is a schematic illustration of the elements of the data scanner of FIG. 5, constructed and operative in accordance with the present invention.

Reference is now made to FIG. 6 which shows the sub elements of data scanner 814. Data scanner 814 may further comprise a problem identifier 8141, an anomaly detector 8142 and a data cleaner 8143.

Problem identifier 8141 may use built-in logic to identify problem types such as collections that are not in use that take up costly storage space. It may also identify tables that are not mentioned in the application code or collections that have not been accessed/modified over a long period, possibly indicating that the data stored in a table is no longer needed for the application and can be deleted.

It may also identify missing field values, rows with duplicate keys and future dates in date columns, i.e., an unreasonable value can indicate an error in data entry Problem identifier 8141 may further determine wrong column types such as text columns where the vast majority of values are numeric/date and should be converted to the appropriate type to prevent type mismatches.

Anomaly detector 8142 may be a ML (machine learning) model and may identify concerns that do not fall into one of the above-mentioned types, for example, unexpected numeric values such as age>120 etc. Anomaly detector 8142 may identify an anomaly score and then use an isolation forest algorithm to detect anomalies using isolation (how far a data point is from the rest of the data). It will be appreciated that this may be an appropriate method as long as it does not rely on distribution parameters and works well with Boolean data (and string data after "one-hot" encoding).

Anomaly detector 8142 may also measure anomaly significance. It will be appreciated that sorting all the data points based on anomalous score does not mean that the "highest" one is an anomaly. Thus, to be eligible to give the answer "no anomalies found," anomaly detector 8142 may use, as an example, mean-shift clusterization without a preliminary stated number of clusters.

Anomaly detector 8142 may further use a random forest classifier to return meaningful insights from "black box" algorithms. For example, anomaly detector 8142 may measure the importance of the features involved. It will be appreciated that feature importance coefficients may help visualize the analysis results making them more transparent.

Figure 7:
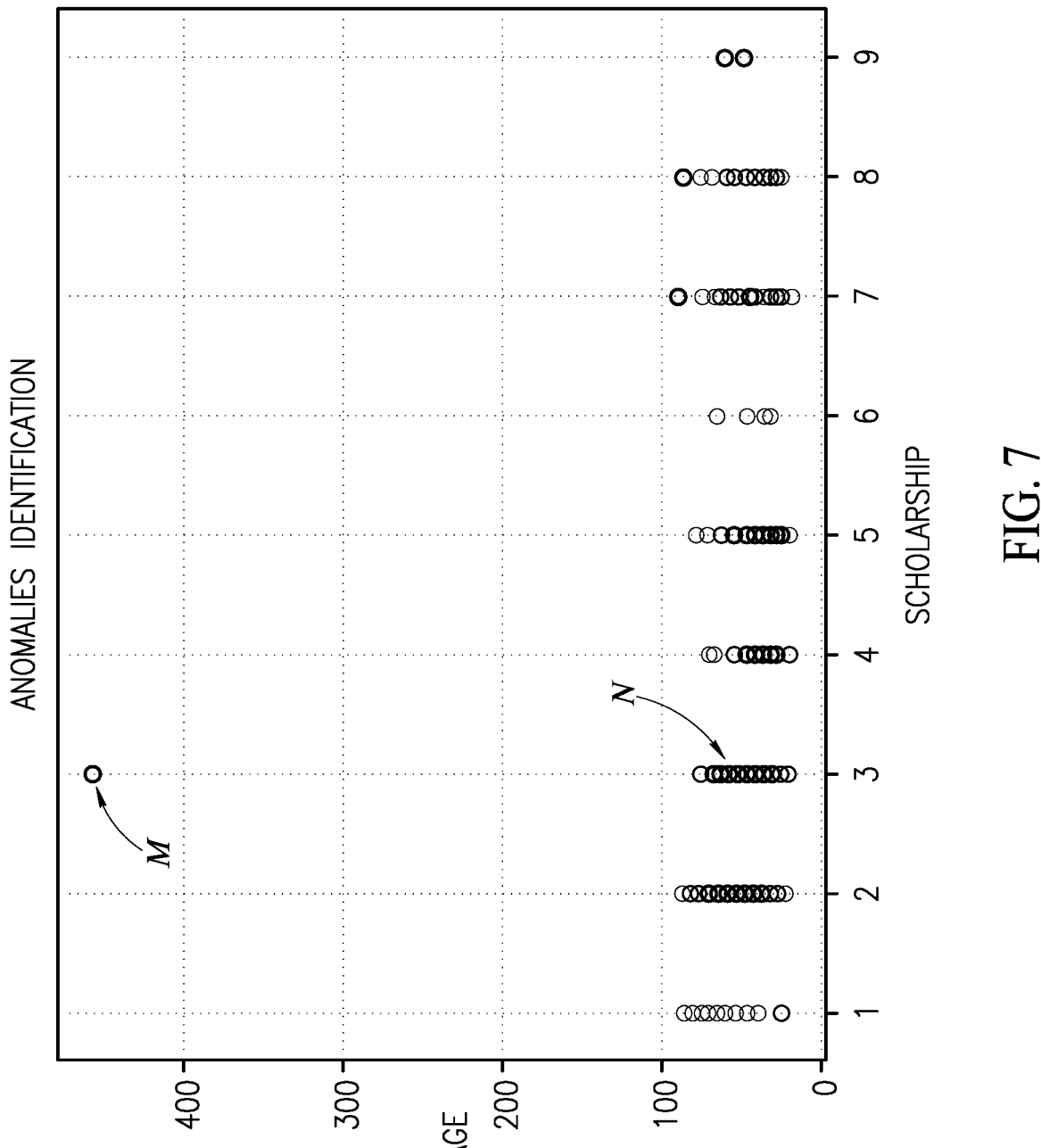
FIG. 7 is an example chart of anomaly detection by the anomaly detector of FIG. 6, constructed and operative in accordance with the present invention.

Reference is now made to FIG. 7 which illustrates anomaly detection by anomaly detector 8142 for a graph showing age/scholarship. An example anomaly that could be identified could be a scholarship winner whose age significantly differs from the age of regular winners of the same scholarship. When forming anomalous groups, the most abnormal data is recorded, marked and presented to the user (in this scenario anomaly M) in relation to "normal" anomalies (marked N). This helps the user check data integrity and avoid any inconsistency. Once the user redefines and updates the values, the pertinent algorithm could be "retrained" and reevaluate anomaly score.

Data cleaner 8143 may provide data cleansing methodologies such as processing null/NaN data, processing string/char data with "one-hot" encoding methodology, converting Boolean data to integer flag, and converting date/time data to integer. For example, a collection with numeric data may be cleaned up by dropping NaN/null data and additional characters such as $, %. #, ~ may be deleted.

It will be appreciated that some organizations develop multiple applications, each application developed by a different development team. This can lead to the organization developing the same functionality multiple times. By comparing the structure of multiple applications developed in the organization, application identifier 815 may identify applications with similar structures and patterns both within the WBS and external to the WBS, thus enabling code reuse which leads to reduced development cost and better maintainability.

Furthermore, application identifier 815 may identify infrastructure components with a similar structure embedded in several applications and refactor these components as independent packages used by several applications.

Data set generator 816 may then generate a structured data set (based on XML, JSON, or other file structures that support the required functionality), i.e., the finalized site object for the identified application. This data set may contain the site analysis, including edges, cross-use, etc.

Database coordinator 817 may coordinate between SOBE 81 and CMS 50 to retrieve such information as user code (client-side code, backend code and configuration files), site metadata, site configuration (signup options and privacy settings) and content collections (data assets). It will be appreciated that CMS 50 may store all website related information as well as editing history and website related business information as shown in FIGS. 3A and 3B of U.S. Pat. No. 10,073,923.

A bill of software materials is typically a document that lists the elements and resources required to build or develop a software application.

It will be appreciated that SOBE 81 may produce the base WBS structure, which is sent for analysis by SBMB 82, which, in turn, sends back an enriched site object with a software bill of materials for the WBS. SOBE 81 may also perform its own enrichment of the WBS site object.

Figure 8:
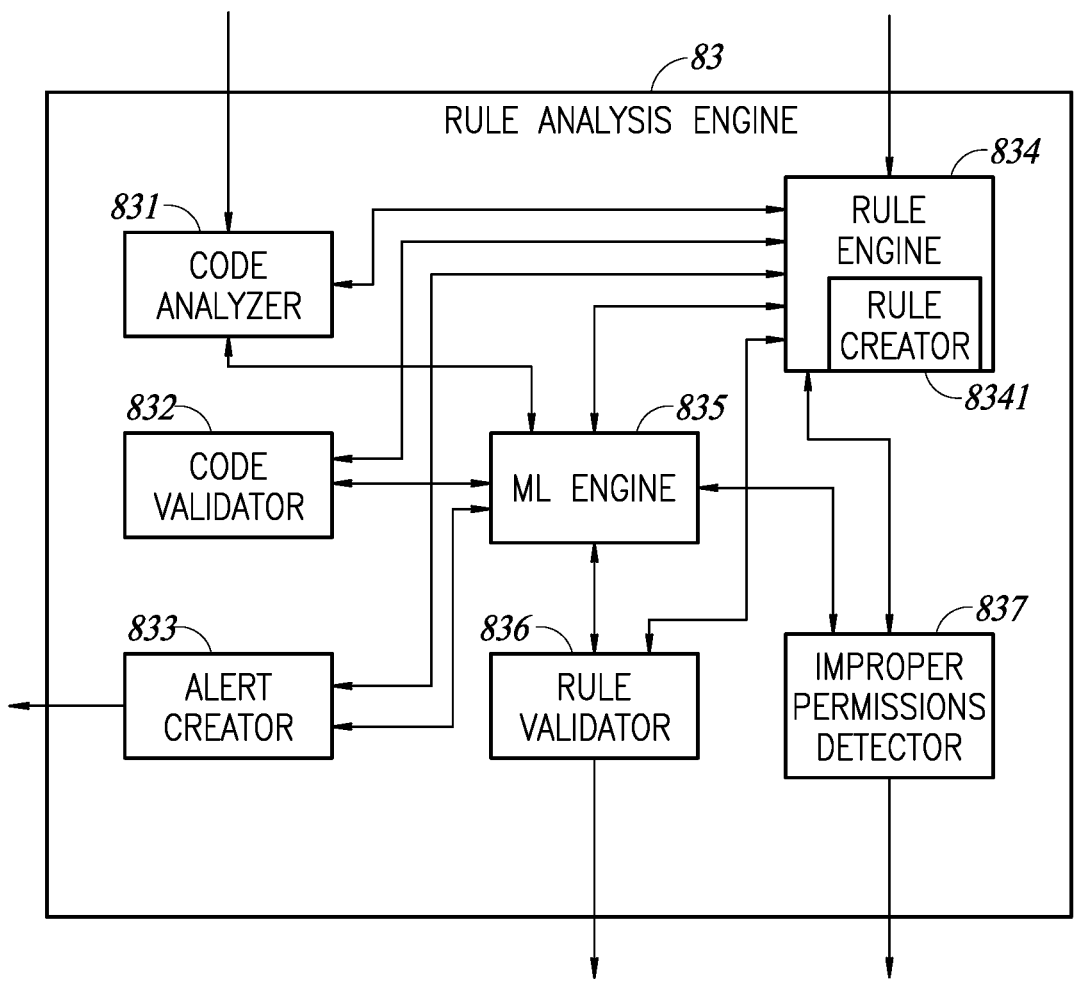
FIG. 8 is a schematic illustration of the elements of the rule analysis engine of FIGS. 4A and 4B, constructed and operative in accordance with the present invention.

RAE 83 may be used to create security, code, and performance-related alerts as well as verify code, data, rules, and permissions. Reference is now made to FIG. 8 which illustrates the sub elements of RAE 83. RAE 83 may comprise a code analyzer 831, a code validator 832, an alert creator 833 a rule engine 834, an ML engine 835 having one or more ML models, a rule validator 836 and an improper permissions detector 837. In an alternative embodiment, code analyzer 831 may be part of SOBE 81 or an external module. Rule engine 834 may create and execute validation rules and may further comprise a rule creator 8341. Rule creator 8341 may provide the ability to create a myriad of validation rules based on site-assets and their attributes. The rules may be system created (using for example artificial intelligence or NPL), user created or both.

As discussed herein above, SOBE 81 creates a system object containing relevant information about the website or the underlying system (including, for example, actual code, structure of databases and system configuration). SOBE 81 passes the system object to RAE 83, which reviews the analyzed system elements, selects for them applicable rules, applies the rules to the reviewed elements, collects the status for all the relevant rules, and returns the information to SOBE 81.

For example, when SOBE 81 builds the site object, it may trigger an evaluation process in RAE 83 that dissects the types of assets and assets relations as described herein above against a list of rules. This flow may be based on SOBE 81 providing a site object and receiving back the object together with information on which elements have failed or passed according to the rules.

Reference is now made to FIGS. 9A and 9B, which illustrate an exemplary set of code and performance rules, as used in an embodiment of system 200 and to FIG. 9C, which illustrates a set of security-related rules, as used in an For example, for code in a front end page that interacts with UI elements by name, RAE 83 may validate that elements which are mentioned in the code (typically by using unique ID literals) actually exist in the page, something a standard linter will not be able to do. Likewise for code that interacts with a database table, RAE 83 may validate that the tables and columns that are mentioned in the code (again these are typically referenced by unique IDs) actually exist in the DB schema of the application. It will be appreciated that code that interacts with a database may be front end or back end code.

Code validation rules may also be implemented by code validator 832 based on an ML (machine learning) model. For example, code analyzer 831 may implement rules to detect usage of plain-text secrets in the code (e.g., API keys etc.) by building a model that represents valid string literals in the code base. Code analyzer 831 may then compute the anomaly score for string literals from the model that is used using ML anomaly detection techniques and instruct alert creator 833 to create an alert if it finds literals with high anomaly scores.

It will be appreciated that code validation rules may be stored internally in CMS 50 as well as abstract data structures, which may be used by code validator 832 for the process of validating user code.

It will be further appreciated that rules may consist of SPEC and PREDICATE parts. The SPEC part defines the code elements to which the rule applies, and the PREDICATE specifies the condition that the code element should conform to. The predicate is described in terms of a Boolean evaluation tree, where the leaves are concrete tests (for example INSIDE (while) matches any expression that is contained in the body of a 'WHILE' expression), and the internal nodes are logical operation like AND/OR/NOT etc. Following is a table representing a sample of an internal representation of code related rules.

| Rule Name | SPEC | PREDICATE | Comments |
|---|---|---|---|
| NoAwaitInLoop | AwaitExpr | NOT( INSIDE(While) OR INSIDE(For) OR INSIDE(Foreach) ) | Prefer using await.all instead of await in loop |
| AwaitBECall | FuncCall where source(Func) is Backend | INSIDE(Await) OR INSIDE(Then) | Make sure to await for the result of calling an async function |
| MultipleDefinition | FuncDef | COUNT(Func.Name) == 1 | Make sure there are no multiple definitions with the same name. |
| UnusedExport | ExportExpr | Export.name IN Site.Imports | Make sure that all the exported symbols are used - Site Scope | embodiment of system 200. As can be seen, each rule may have a designated area and purpose.

Reference is now made to FIG. 10 which illustrates a number of code concerns displayed in a GUI associated with system 200. In this example, a source code file (element-uti.js) is flagged with multiple errors (such as BE_NO-_AWAIT and UNUSED_EXPORT) as marked.

Since system 200 may have the full context about the environment in which the code operates, rules may be defined that apply to levels that are above the pure programming language level (such as the lint-like rules supported by standard interactive development environments (IDEs)).

Figure 11:
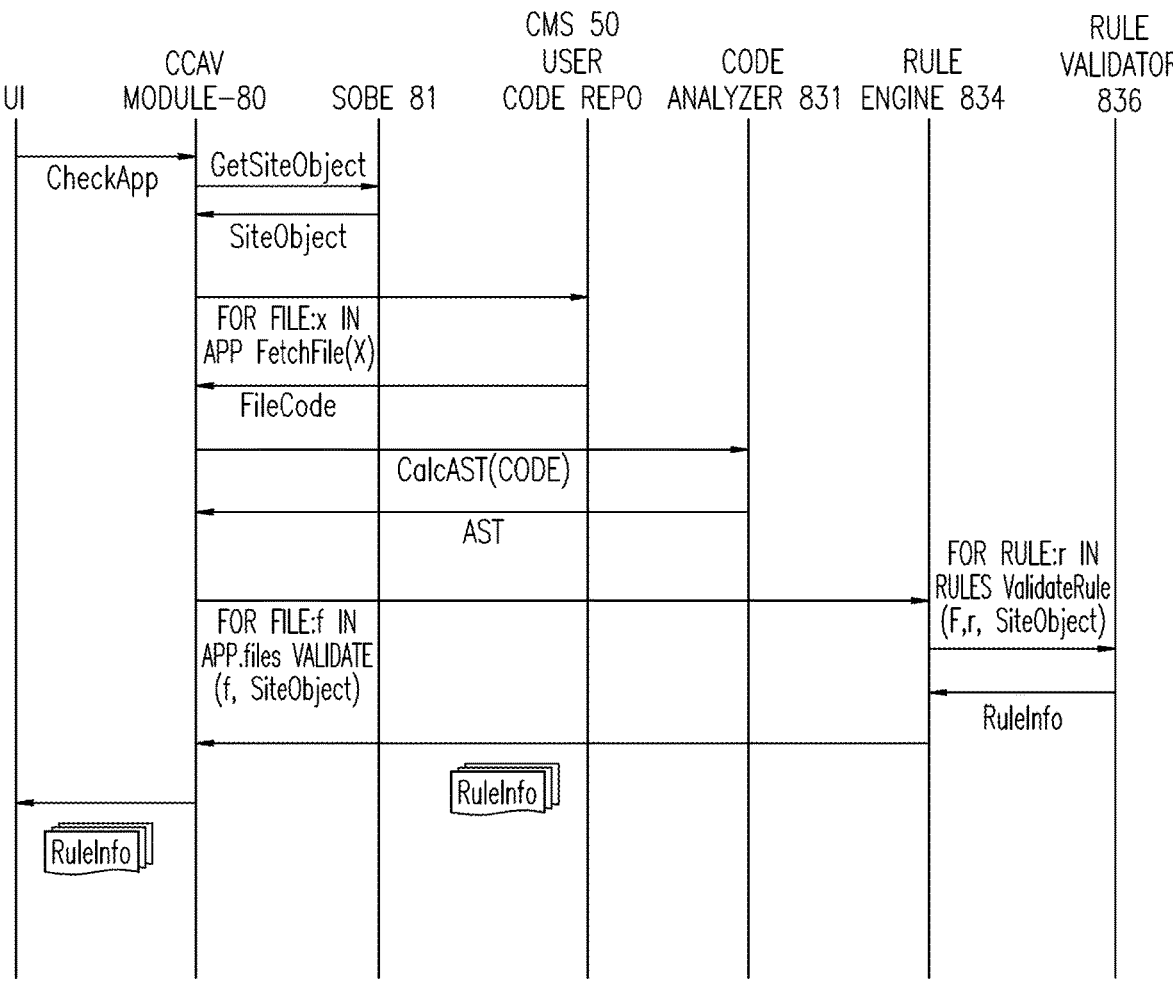
FIG. 11 is a schematic illustration of the flow operation for code validating rules used by the rule validator of FIG. 8, constructed and operative in accordance with the present invention.

Reference is now made to FIG. 11 which illustrates a flow of operation for code validating rules used by rule validator 836 for code validation rules and for rule engine 834 handling them. As can be seen, AST is the Abstract Syntax Tree of the code in the analyzed file and RuleInfo is the information returned by rule validator 836 such as the location of the issue which the rule identified in the code file, and additional relevant details like function name etc.

As discussed herein above RAE 83 may comprise an improper permissions detector (IPD) 837. IPD 837 may use the parsed permissions attributes of assets (pages, databases, APIs) and access logs that contain asset information and the identity type of the caller to identify anomalies in data access. It will be appreciated that IPD 837 may recognize the identity of a user that should have access to a particular resource using an anomaly detection model. It may then compare the permission configuration with the existing for that resource. By combining actual access data with configuration data, IPD 837 may identify concerns related to permission assignment in web applications such as overly permissive service configuration, where the client is using a very specific permission set, but the service's permissions allow more actions than needed. IPD 837 may also identify insufficient permission assignments for the client, which could cause application usability problems. An example of improper permission detection may be a permission on a specific backend function was configured to allow anyone to invoke the function. Through an analysis of the traffic, IPD 837 may detect that the normal traffic (99.9% of the traffic) is made by the admin role and the anomaly (0.1%) is made by a simple site visitor thus identifying a mistake in the permission configuration of the function.

Thus, detected improper permissions may assist application developers and security staff in identifying the exact permissions intended to be used by the application and fine-tune permissions automatically with a high level of confidence and a low chance for false positives and false negatives.

For example, IPD 837 may identify permission discrepancies between a resource access log which may include data on requests that were sent to various system resources. Data that is sent from the resource access log to IPD 837 may include resource identification such as an API for deleting a user from a system which may be identified as resource #1. Data may also include the number of successful requests to the resource per identity type and common identity types including anonymous site visitors, system administrators, blog writers, etc. A successful request is a request that does not return an unauthorized error.

An example of data sent from the resource access log to IPD 837 may include:

|  | identity#1 | identity#2 | identity#3 |
|---|---|---|---|
| resource#1 | 1000 | 10 | 0 |
| resource#2 | 5 | 0 | 1000 |

Another data source that could be used by IPD 837 is a permission schema/catalog. This is a set of rules that dictate the decision as to whether the identity will get access to a particular API/as set/functionality.

The data received from the permission schema/catalog is a list of identities that are allowed for each resource. The list is a flattened view of the list of permissions allowed for the API which returns a list of unique identities that are allowed to those permissions. An example of output from the permission schema/catalog data resource may be "[identity #1, identity #3]".

Figure 12:
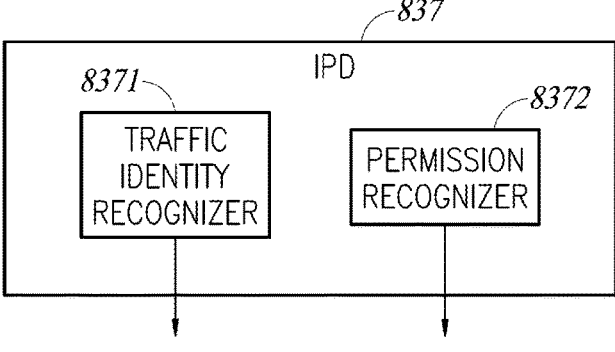
FIG. 12 is a schematic illustration of the elements of the improper permissions detector of FIG. 8, constructed and operative in accordance with the present invention.

IPD 837 may use two main methodologies to analyze the data received from the resource access log and the permission schema/catalog. Reference is now made to FIG. 12 which illustrates the sub elements of IPD 837. IPD 837 may further comprise a traffic identity recognizer 8371 and a permission recognizer 8372.

Traffic identity recognizer 8371 may use an anomaly detection algorithm to deduce the main identities calling the resource. Traffic identity recognizer 8371 may loop through the identities and resources and return either an inconclusive result or a list of the 'main' identities calling the resource.

Traffic identity recognizer 8371 may receive data from the resource access log, deduce the main identities calling the resources and then calculate the percentage of successful accesses for the identity type out of the sum of successful accesses. The identities with a percentage value larger than a threshold, or a range of thresholds, are then marked by traffic identity recognizer 8371 as the 'main' identities calling the service. If several identities have similar percentage values out of the total successful requests, the sum of their percentage values is validated to be greater than a threshold value. If the percentage values of the identities are similar, the difference between them is validated to be less than a threshold.

Permission recognizer 8732 may detect permission misconfigurations. It may use the 'main' identities as compiled by traffic identity recognizer 8371 and compare it to a list of identities received from the permission catalog. An identity that is included in the list from the permission catalog but missing in the list from the 'main' identities, is marked as a potential misconfiguration finding.

It will be appreciated that in this scenario, ML engine 835 may be activated to learn the normal percentage of the identities calling the resources in the actual usage of the system as described in more detail herein below.

Figure 13:
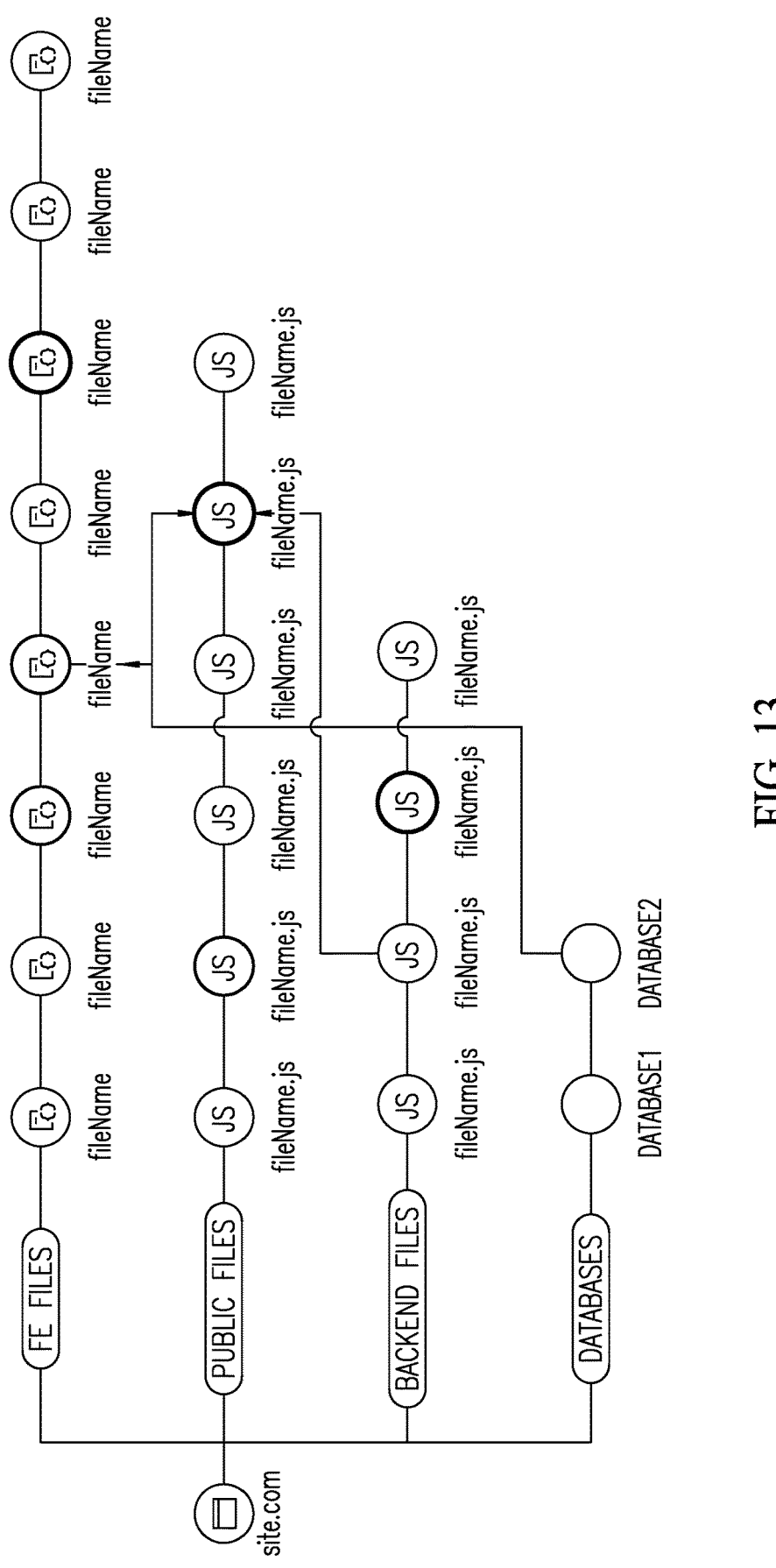
FIG. 13 is a schematic illustration of an example relationship between the different elements of an underlying application using the CCAV module of FIG. 4, constructed and operative in accordance with the present invention.

SAD renderer 84 may create a system architecture diagram (SAD) i.e., a visual representation of site entities (such as assets and relations), and their access to third-party services based on the software bill of materials as is illustrated in FIG. 13 to which reference is now made. FIG. 13 illustrates an example relationship between the front-end components (pages), server-side APIs, and data sources (databases).

SAD renderer 84 may utilize information derived from the static code and configuration analyses from SOBE 81 and render a visual picture of their relationships using edge and node objects.

It will be appreciated that since some objects within SOBE 81 contain metadata, some metadata may be parsed into edge attributes, which indicates the relationship between an element and other elements and their attributes or edges within the evaluated solution (i.e., the analyzed website).

Figure 14:
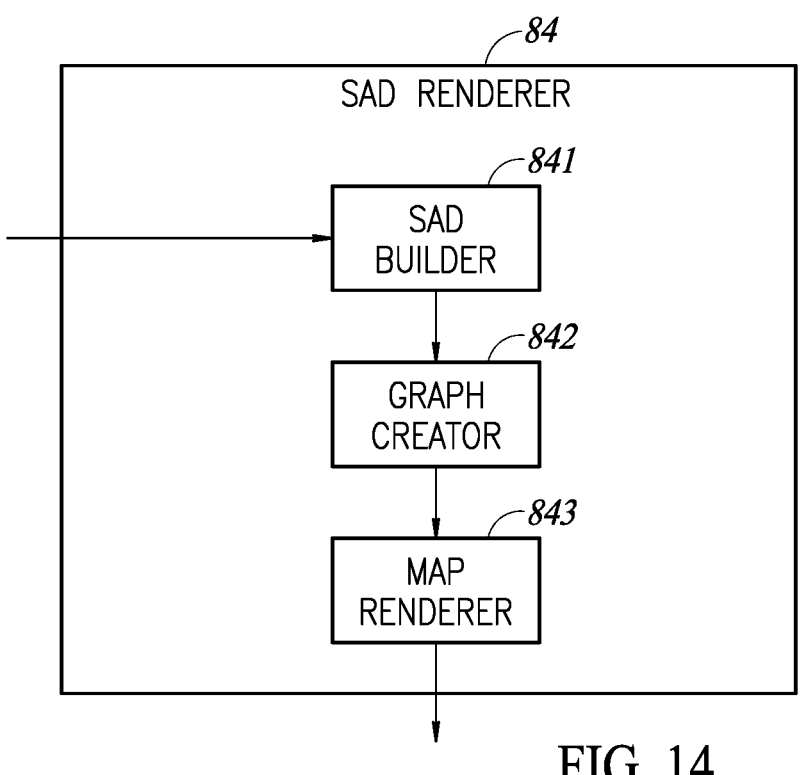
FIG. 14 is a schematic illustration of the elements of the system architecture diagram (SAD) renderer of FIG. 4, constructed and operative in accordance with the present invention.

Reference is now made to FIG. 14 which illustrates the elements of SAD renderer 84. SAD renderer 84 may comprise a SAD builder 841, a graph creator 842, and a map renderer 843.

SAD builder 841 may build the SAD by traversing the system elements (e.g., code files, DB tables, config files) and extracting their relationships to other system elements (e.g., IMPORT and INCLUDE statements in code files, FOREIGN_KEYs in DB tables, references to external services via FETCH statements).

Figure 15:
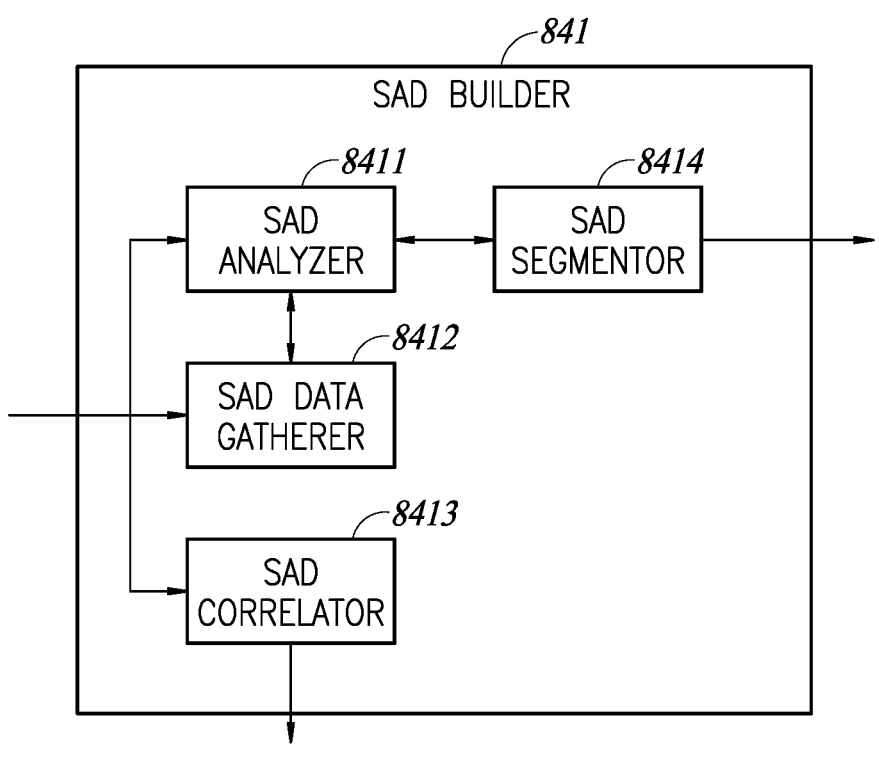
FIG. 15 is a schematic illustration of the elements of the SAD builder of FIG. 14, constructed and operative in accordance with the present invention.

Reference is now made to FIG. 15 which illustrates the elements of SAD builder 841. SAD builder 81 may comprise an SAD analyzer 8411, an SAD data gatherer 8412, a SAD correlator 8413 and an SAD segmentor 8414.

SAD analyzer 8411 may analyze data gathered by data gatherer 8412 from other users and applications, either from the same platform (or WBS) as the underlying or different platforms (e.g., using access APIs or web services). Such data gathering may provide comparative data to that gathered for the current underlying application as well as possible data from other applications of the same user.

Data gatherer 8412 may ensure the privacy, anonymity, and copyrights (or other intellectual property rights) of the users whose data is being analyzed. SAD analyzer 8411 may (for example) only provide suggestions based on statistical summarizing of multiple users and only in cases where a sufficiently large number of users can be analyzed. SAD analyzer 8411 may further use techniques from the area of statistical database security.

In order to select the most prominent or otherwise relevant business key performance indicators changes and system configuration changes, CCAV module 80 may use ML (machine learning) prediction techniques. ML engine 835 may build, train, and operate ML models based on past changes and their impacts (on key performance indicators or otherwise) and apply the model to identify the correlation between new system changes and their consequences.

SAD correlator 8413 may correlate changes to the elements between the static application architecture diagram and the aggregated application architecture diagram. For example, SAD correlator 8413 may correlate an additional cost incurred by licensing a new recommendation engine (e.g., for use within the website) with the additional sales that were generated by sales that are based on recommendations made by the engine. This correlation can help ensure that the change positively impacts the application's profitability. Reference is now made to FIG. 16 which illustrates how SAD correlator 8413 may correlate changes to underlying application components (code, DB s, configuration, external APIs) with changes related to business and other key performance indicators. List X lists various elements of information which match the system business key performance indicators (such as number of new users, page views, purchases). List Y lists changes to the system elements such as to code and to databases. SAD correlator 8413 may synchronize the business information and the technical changes and create an integrated timeline (or other representation), from which the graph creator 842 may create a graph that correlates the system changes to underlying application key performance indicators (such as business results).

SAD correlator 8413 may thus correlate the static performance, e.g., whether the external service X costing Y provides benefit Z1 to the current user comparable to the benefit Z2 provides to other similarly situated users. SAD correlator 8413 may also correlate the effects of dynamic changes, e.g., the impact of change X made by the current user in the system configuration, structure, or other parameters provide a benefit similar to that provided to other users.

It will be appreciated that as part of the above-mentioned analyses for both a current user as well as for other users, SAD renderer 84 may employ techniques for segmentation.

Graph creator 842 may then create a graph representing the application. The nodes are the system elements mentioned above, and the directed edges are the relations extracted from these system elements. The edges may be bi-directional based on the flow of data or functionality in the analyzed underlying system.

After the edges have been calculated by graph creator 842, map renderer 843 may render a map object based on the graph on the server-side and deliver it to the front-end display managed by the WBS. The map object may be cached in the server and updated in the user's session based on an action performed in the WBS.

Reference is now made to FIG. 17 which illustrates the process of building a SAD from the software bill of materials as provided by SBMB 82. In the outlined example, SAD builder 841 may use information from SOBE 81 about the two source files (code file A and code file B). In this example it uses an easily accessible array-like data structure containing the code elements that are relevant for the process of SAD construction (for example import statements, invocations of external services, interacting with DB tables etc.). These elements are shown in tables C and D of the figure.

SAD builder 841 may then use the IMPORT statements, the FETCH operation to an external service, and the DB QUERY operation previously extracted from the code files to establish the relations between the system elements. For example, if code file A is invoking a function defined in code file B and later fetches information from table D, graph creator 842 may calculate the edges (A→B) and (D→A).

As discussed herein above CCAV module 80 may display information obtained from various sources as an overlay integrated with the static application architecture diagram. This display is useful to understand the impact of various concerns and prioritize development and resource acquisition for the application. For example, if the application owner discovers a new security vulnerability in several front-end components of the application, he can prioritize the development effort so that the components that receive higher user traffic will be fixed before components where the traffic is lower.

It will be appreciated that the SAD may comprise a static application structure diagram that shows only the static application of structure of the information derived from the software bill of materials and an aggregated application architecture diagram that shows extra displayed information as an integrated overlay as described herein above derived from an analysis of gathered material which is correlated and segmented by SAD builder 841 as described in more detail herein below.

An example of this is the application owner purchasing a service that improves the acquisition funnel of page visitors, the application owner may use information about sales made on the site to integrate the service with areas in the application that generate more revenues.

In an alternative scenario, if the application owner discovers PII exposure in several database tables, he may prioritize fixing the issue based on actual queries that use the impacted table and fix tables that users are querying more frequently.

In addition to the static structure of the application, which can be derived by analyzing the gathered information (applications code & data, platform BI information, etc.), SAD builder 841 may also use data based on live traffic and application usage for the aggregated application architecture diagram. Such data may be stored in a separate external storage (that does not belong to the underlying system being analyzed) and may contain information such as event type: front-end (FE) page visits, calls from FE to back-end (BE) code, queries to a database and requests to a third-party API or web service. Other information used may be (for example) date and time, duration of visit and other identifiers of the elements involved in the event such as App ID, and DB Table name.

In addition, SAD builder 841 may also use information from the system object as created by SOBE 81 regarding the DB tables which are used by the application, such as the number of items in each table and the number of read/write operations performed.

SAD builder 841 may overlay this data over the static application architecture diagram, enabling graph creator 842 to integrate an aggregated dimension into the displayed SAD. An example may be a database representation by the SAD which may include integrated data of the configured permissions and total number of records and number of queries in a specific time period.

In another example, graph creator 842 may draw the diagram nodes in a size that reflects the traffic it receives, eliminate nodes that get no traffic at all to simplify the architecture diagram, use the amount of traffic from one node to another to set the edge width or use operational statistics (such as duration) to highlight paths in the SAD causing delays for user-facing operations or massive batch computations.

Reference is now made to FIG. 18 which illustrates how graph creator 842 may integrate traffic and query volume information into the static application architecture diagram to create an aggregated application architecture diagram to emphasize front components and tables that are frequently used, allowing the application owner to focus on the most important application elements. In this example as shown, the resultant aggregated application architecture diagram shows a combination of static architecture nd dynamic live traffic in order to present an overall diagram containing the same system components but with different sizes emphasizing the actual live usage of each component in the diagram. The aspect ratio between the elements in the aggregated diagram is in a direct linear relationship to the actual use by traffic of each component.

It will be appreciated that operational and business data may also be incorporated into the SAD. This includes extracting information regarding (for example) revenues and costs associated with the web application.

Revenues may be associated, for example, with front-end components, pages, or page elements of the system where specific goods or services are sold.

Costs may be associated with the resources required to deliver the application functionality. These resources could include, for example, hardware resources (virtualized or real) that are needed to run the application and the software, services, and 3rd-party API fees that are used by the application.

Figure 19:
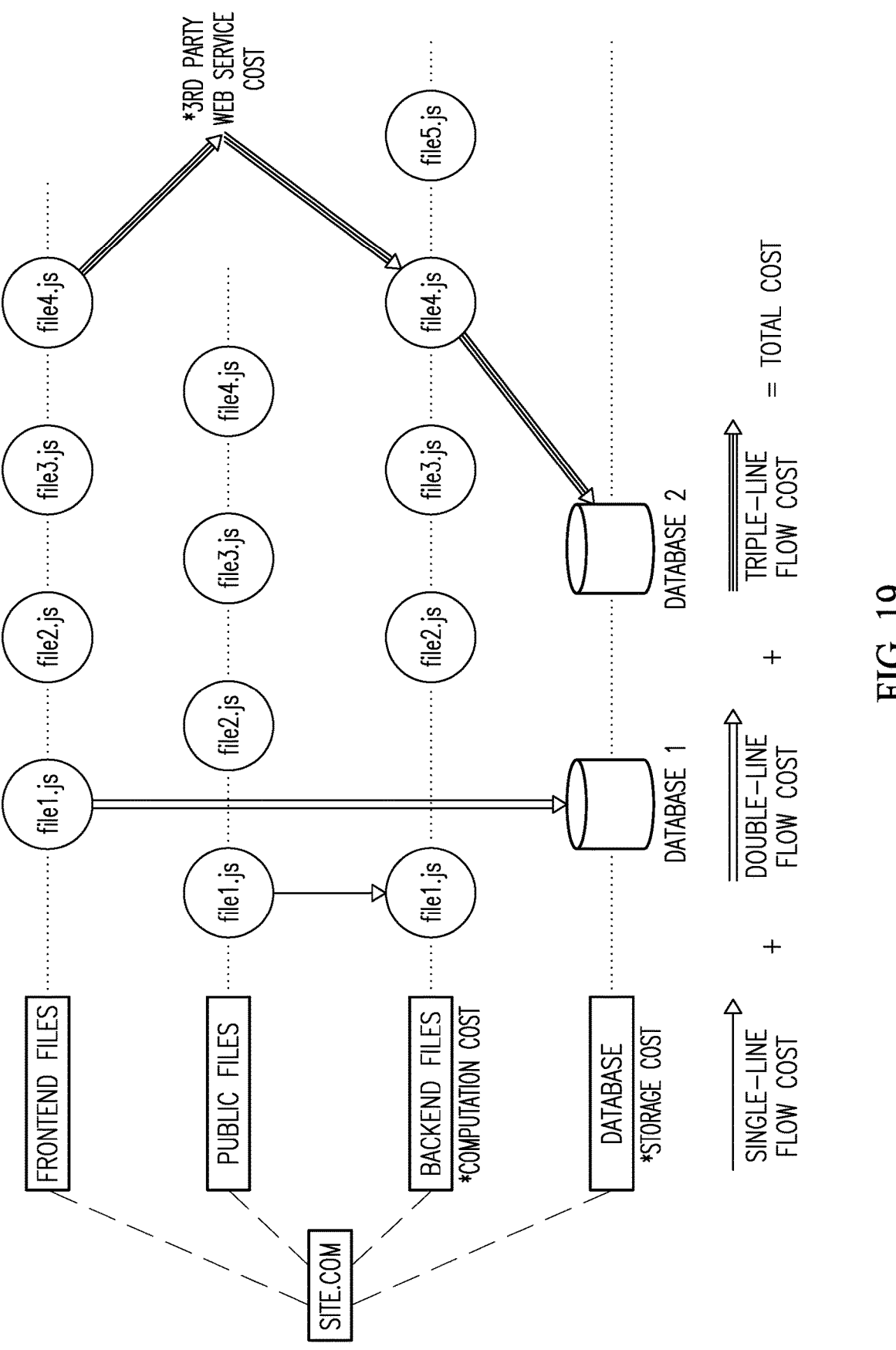
FIG. 19 is a schematic illustration of an aggregated application architecture diagram showing different arrows representing the overlay of different application flows and along with cost of the usage of different elements, constructed and operative in accordance with the present invention.

Map renderer 843 may display this (for example) as a special layer over the application SAD where the costs and profits of which can be attributed to specific elements and/or business flows are displayed next to them as is illustrated in FIG. 19 to which reference is now made.

FIG. 19 represents an aggregated application architecture diagram showing different arrows representing the aggregation of different application flows and along with cost of the usage of different elements. For example, the triple line flow represents a front-end code running in a browser that is calling a 3rd party service which in turn calls a webhook that invokes a function running in a backend file which makes a query to a database. The cost of this flow will sum the 3rd party service cost, the backend computational cost and the database storage cost. By calculating the revenue of the line flow minus the cost, the user may have a better picture of the system design.

Furthermore, CCAV module 80 may store historic revenue/cost data and map renderer 843 may display them in a time-series chart by looking at the different costs over time, with additional overlays of software and hardware changes made in the web application to identify opportunities for enhancing the revenues or reducing the costs.

SAD segmentor 8414 module may segment the analyses of the effect of a given system change based on user segments (which could be based on geography, user classes or types, application parameters, application underlying template, editing history, BI, etc.). Thus, a given change may provide (for example) benefits for one geography while being detrimental for other geographies. The segmentation process may thus provide this information so that changes to the system may be applied selectively by geography. An example of this are the line flows with the same cost but with different revenues for different locations of the site visitor in the example of FIG. 19 back to which reference is now made.

SAD segmentor 8414 may also segment the information gathered from other users and applications based on parameters and attributes of such users and applications. This segmentation may help select relevant comparison targets for the current user or application.

Once map renderer 843 has rendered the finalized SAD, a user may use a dedicated CCAV editor 85 to modify the application directly from the UI of system 200. CCAV editor 85 may be a WYSIWYG editor and operation applier module that can accept UI operations performed on the rendered SAD and may apply them to the internal system representation object, and then re-draw the components that need to be modified. A user may use CCAV editor 85 to move a function from one file to another, to split a file into two, to duplicate a file, to join two files into a single one, to delete a file that contains unused code and to delete a function that is not in use. It may also be used to delete a collection that is not in use or to double-click on a node to get to a dedicated editor suitable for the body type, e.g., an interactive development environment for editing page code, data entry, and DB schema editor for editing DB tables.

Thus, by analyzing an underlying application and creating a site object and software bill of materials, a system architecture diagram can be rendered to provide a user of a WBS with a visual representation and full context of his application together with an aggregated version showing the effect of any modifications giving a user full control of his application.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A website building system (WBS), the system comprising:

at least one hardware processor; and a component analysis and visualization (CCAV) module running on said at least one hardware processor to analyze components of an underlying application built using said WBS and to generate a visual system architecture diagram (SAD) representing a hierarchical arrangement of said components, said CCAV module comprising:

a site object build engine (SOBE) gathering and analyzing information on said components and to create a site object representation for said underlying application, wherein said SOBE is configured to create asset edges by breaking user code and dependency code of into functions, methods, and internal components;

a software bill of materials builder (SBM) to create a SBM from said site object representation consisting at least of asset edges and configuration data for said underlying application; and a SAD renderer create and display said SAD wherein said SAD comprises a static application architecture diagram representing said at least asset edges and configuration data;

and an aggregated application architecture diagram (AAAD) displaying multiple overlays over said static application architecture diagram showing at least live updates of at least two of: software changes, hardware usage, and business data changes affecting said underlying application;

wherein said SAD renderer dynamically integrates said AAAD as a dynamic dimension within said SAD display based on correlating changes to said components between said static application architecture diagram and said AAAD; and a CCAV editor accepting user interface operations performed on said displayed SAD and applying said operations to an internal system representation object to modify underlying application, wherein said modification comprises at least one of: moving a function between files, splitting a file, or deleting an unused function.

2. The WBS according to claim 1 wherein said at least asset edges and configuration data comprise at least one of: site code, user code, dependency code, and metadata and attributes for said underlying application.

3. The WBS according to claim 2 and further comprising:

a rule analysis engine to provide and execute validation rules for said site object build engine.

4. The WBS according to claim 3 and further comprising an evaluation engine to evaluate and make recommendations for said underlying application.

5. The WBS according to claim 3 wherein said site object build engine comprises at least one of:

an identification (ID) receiver to receive an ID for said underlying application and to retrieve said at least asset edges and configuration data for said underlying application according to said ID;

an asset correlator to perform cross asset correlations according to said metadata and attributes to identify iterable references across different asset types;

a data scanner to scan tables of databases used by said underlying application;

a data set generator to generate said site object;

a database coordinator to coordinate between said site object build engine and at least one database of said WBS; and an application identifier to identify applications with said WBS with similar structures and patterns to said underlying application to enable code reuse.

6. The WBS according to claim 5 wherein said data scanner comprises:

a problem identifier to identify problem types within said underlying application;

an anomaly detector to identify anomalies within said underlying application that do not fall under said problem types; and a data cleaner to apply data cleansing methodologies to said metadata.

7. The WBS according to claim 6 wherein said rule analysis engine comprises at least one of:

a code analyzer to implement code validation rules for said site code, said user code and said dependency code;

a code validator to validate results of said code analyzer;

an alert creator to create an alert if an anomaly is found by said anomaly detector;

an ML (machine learning) engine to build, operate and train ML models for said CCAV module;

a rule validator to validate said validation rules for said code analyzer;

a rule engine to create and execute said code validation rules, wherein said rule engine further comprises a rule creator to enable at least one of manual and automatic creation of said validation rules according to said at least asset edges and configuration data; and an improper permissions detector to identify anomalies in data access to said underlying application by its end users.

8. The WBS according to claim 7 wherein said improper permissions detector comprises:

a traffic identity recognizer to recognize said end users accessing said underlying application; and a permission recognizer to detect permission misconfigurations for said end users.

9. The WBS according to claim 1 wherein said SAD renderer comprises:

a SAD builder to create said aggregated application architecture diagram from information gathered externally and internally to said WBS;

a graph creator to integrate said aggregated application architecture diagram as a dynamic dimension within said SAD display; and a map renderer to render said SAD display.

10. The WBS according to claim 9 wherein said SAD builder comprises:

an SAD data gatherer to gather data internal and external to said WBS and to ensure privacy, anonymity, and copyright protection;

an SAD analyzer to analyze data collected by said SAD data gatherer to provide comparative data to data of a current underlying application;

an SAD correlator to correlate changes to said elements between said static application architecture diagram and said aggregated application architecture diagram; and an SAD segmentor to segment results of said SAD analyzer according to user segments.

11. The WBS according to claim 1 wherein said underlying application is at least one of: a website, a native desktop application, a mobile application, an embedded software, and an application embedded within or which are a part of a larger system or platform.

12. The WBS according to claim 2 wherein said at least asset edges and configuration data further comprise at least one of: content collections, databases, permissions, site registration configuration, cloud configuration, libraries and application programming interfaces (API's).

13. The WBS according to claim 10 wherein said user segments are based on at least one of: geography, user class or types, underlying application parameters, underlying application templates, editing history and business information.

14. The WBS according to claim 9 wherein said map renderer displays said overlays as at least one of: a combined information display, multiple display tabs and a 3D display.

15. The WBS according to claim 1 wherein said components comprise at least one of: pages and containers, visual code, databases, third party applications, content elements, layout elements, non-visible objects, back-end objects and auxiliary objects.

16. A method for a website building system (WBS), the method comprising:

analyzing components an underlying application built using said WBS and generating a visual system architecture diagram (SAD) representing a hierarchical arrangement of said components, said analyzing and generating comprising:

gathering and analyzing information on said components to create a site object representation for said underlying application;

creating asset edges for said site object representation by breaking user code and dependency code of into functions, methods, and internal components;

creating a software bill of materials (SBM) from said site object comprising at least of said asset edges and configuration data for said underlying application; and creating and displaying said SAD wherein said SAD comprises a static application architecture diagram representing said at least asset edges and configuration data;

wherein said creating and displaying comprises displaying in real-time an aggregated application architecture diagram (AAAD) displaying multiple overlays over said static application architecture diagram showing at least live updates and at least two of: software changes, hardware usage, and business data changes affecting said underlying application;

wherein said creating and displaying dynamically integrates said AAAD as a dynamic dimension within said SAD display based on correlating changes to said components between said static application architecture diagram and said AAAD; and accepting user interface operations performed on said displayed SAD and applying said operations to an internal system representation object to modify said underlying application;

wherein said modification comprises at least one of: moving a function between files, splitting a file, or deleting an unused function.

17. The method according to claim 16 wherein said at least asset edges and configuration data comprise at least one of: site code, user code, dependency code, and metadata and attributes for said underlying application.

18. The method according to claim 17 and further comprising:

providing and executing validation rules for said gathering and analyzing.

19. The method according to claim 18 and further comprising evaluating and making recommendations for said underlying application.

20. The method according to claim 18 wherein said gathering and analyzing comprises at least one of:

receiving an identification (ID) for said underlying application and retrieving said at least asset edges and configuration data for said underlying application according to said ID;

performing cross asset correlations according to said metadata and attributes to identify iterable references across different asset types;

scanning tables of databases used by said underlying application;

generating said site object;

coordinating between said gathering and analyzing and at least one database of said WBS; and identifying applications with said WBS with similar structures and patterns to said underlying application to enable code reuse.

21. The method according to claim 20 wherein said scanning tables comprises:

identifying problem types within said underlying application;

identifying anomalies within said underlying application that do not fall under said problem types; and applying data cleansing methodologies to said metadata.

22. The method according to claim 21 wherein said providing and executing validation rules comprises at least one of:

implementing code validation rules for said site code, said user code and said dependency code;

validating results of said implementing;

creating an alert if an anomaly is found by said identifying anomalies;

building, training and operating machine learning (ML) models for said analyzing and generating module;

validating said validation rules for said implementing code validation rules;

creating and executing said code validation rules, wherein said creating comprises enabling at least one of manual and automatic creation of said validation rules according to said at least asset edges and configuration data; and identifying anomalies in data access to said underlying application by its end users.

23. The WBS according to claim 22 wherein said identifying anomalies in data access comprises:

recognizing said end users accessing said underlying application; and detecting permission misconfigurations for said end users.

24. The method according to claim 16 wherein said creating and displaying said SAD comprises:

creating said aggregated application architecture diagram from information gathered externally and internally to said WBS;

integrating said aggregated application architecture diagram as a dynamic dimension within said SAD display; and rendering said SAD display.

25. The method according to claim 24 wherein said creating said aggregated application architecture diagram comprises:

gathering data internal and external to said WBS and ensuring privacy, anonymity, and copyright protection;

analyzing data collected by said gathering data internal and external to said WBS to provide comparative data to data of a current underlying application;

correlating changes to said elements between said static application architecture diagram and said aggregated application architecture diagram; and segmenting results of said analyzing data collected according to user segments.

26. The method according to claim 16 wherein said underlying application is at least one of: a website, a native desktop application, a mobile application, an embedded software, and an application embedded within or which are a part of a larger system or platform.

27. The method according to claim 17 wherein said at least asset edges and configuration data further comprise at least one of: content collections, databases, permissions, site registration configuration, cloud configuration, libraries and application programming interfaces (API's).

28. The method according to claim 25 wherein said user segments are based on at least one of: geography, user class or types, underlying application parameters, underlying application templates, editing history and business information.

29. The method according to claim 16 wherein said displaying in real-time displays said overlays as at least one of: a combined information display, multiple display tabs and a 3D display.

30. The method according to claim 16 wherein said elements comprise at least one of: pages, containers and components, visual code, databases, third party applications, content elements, layout elements, non-visible objects, back-end objects and auxiliary objects.

* * * * *